United States Patent
Wu et al.

(10) Patent No.: US 11,290,906 B2
(45) Date of Patent: Mar. 29, 2022

(54) CHANNEL MEASUREMENT METHOD

(71) Applicant: HUAWEI TECHNOLOGIES CO., LTD., Guangdong (CN)

(72) Inventors: Ye Wu, Shanghai (CN); Huangping Jin, Shanghai (CN); Xiaoyan Bi, Shanghai (CN); Wei Han, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 35 days.

(21) Appl. No.: 16/832,290

(22) Filed: Mar. 27, 2020

(65) Prior Publication Data
US 2020/0260312 A1    Aug. 13, 2020

Related U.S. Application Data

(63) Continuation of application No. PCT/CN2018/103955, filed on Sep. 4, 2018.

(30) Foreign Application Priority Data

Sep. 30, 2017    (CN) .......................... 201710915057.8

(51) Int. Cl.
*H04W 24/10*    (2009.01)
*H04W 28/06*    (2009.01)
(Continued)

(52) U.S. Cl.
CPC .......... *H04W 24/10* (2013.01); *H04B 7/0417* (2013.01); *H04B 7/0452* (2013.01);
(Continued)

(58) Field of Classification Search
CPC ..... H04W 24/10; H04W 24/08; H04W 24/06; H04W 24/04; H04W 28/06; H04B 7/0417;
(Continued)

(56) References Cited

U.S. PATENT DOCUMENTS 8,675,749 B2 * 3/2014 Khoshgard ......... H04L 27/2647
                                                        375/260
8,731,478 B2    5/2014 Ren et al.
(Continued)

FOREIGN PATENT DOCUMENTS

CN        102113366 A    6/2011
CN        102148666 A    8/2011
(Continued)

OTHER PUBLICATIONS

NTT Docomo,"Feedback Design for CSI Type I and Type II", 3GPP TSG RAN WG1 Meeting NR#3, R1-1716081, Nagoya, Japan, Sep. 18-21, 2017, total 5 pages.
(Continued)

*Primary Examiner* — Candal Elpenord
(74) *Attorney, Agent, or Firm* — Womble Bond Dickinson (US) LLP

(57) ABSTRACT

Embodiments of the present invention provide a channel measurement method. The method includes: obtaining, for a to-be-measured frequency band including at least one reporting subband and at least one missing subband, channel state information of each reporting subband and channel state information of each missing subband, where the channel state information of each reporting subband is obtained based on channel estimation, and the channel state information of each missing subband is obtained according to a reference rule with reference to channel state information of a reporting subband that is indicated by the reference rule and that is in the at least one reporting subband; and sending a measurement report of the to-be-measured frequency band to a transmit end device, where the measurement report includes the channel state information of each reporting subband in the at least one reporting subband.

20 Claims, 9 Drawing Sheets

(51) Int. Cl.
  *H04B 7/0417* (2017.01)
  *H04B 7/0452* (2017.01)
  *H04B 7/06* (2006.01)

(52) U.S. Cl.
  CPC ......... *H04B 7/0626* (2013.01); *H04B 7/0658* (2013.01); *H04W 28/06* (2013.01)

(58) Field of Classification Search
  CPC ... H04B 7/0452; H04B 7/0626; H04B 7/0658
  USPC ....................................................... 370/252
  See application file for complete search history.

(56) References Cited

U.S. PATENT DOCUMENTS

| | | | | |
|---|---|---|---|---|
| 10,848,224 | B2* | 11/2020 | Park | H04W 72/042 |
| 2009/0154588 | A1* | 6/2009 | Chen | H04L 5/0023 |
| | | | | 375/267 |
| 2011/0142144 | A1* | 6/2011 | Allpress | H04L 1/0026 |
| | | | | 375/259 |
| 2012/0076028 | A1* | 3/2012 | Ko | H04B 7/0626 |
| | | | | 370/252 |
| 2013/0301448 | A1* | 11/2013 | Sayana | H04W 24/10 |
| | | | | 370/252 |
| 2015/0098346 | A1* | 4/2015 | Guo | H04B 7/0478 |
| | | | | 370/252 |
| 2015/0327284 | A1* | 11/2015 | Wakabayashi | H04L 25/0224 |
| | | | | 370/252 |
| 2017/0290053 | A1* | 10/2017 | Hwang | H04L 5/0057 |
| 2020/0177254 | A1* | 6/2020 | Lee | H04W 76/27 |

FOREIGN PATENT DOCUMENTS

| | | |
|---|---|---|
| CN | 102291752 A | 12/2011 |
| CN | 102801498 A | 11/2012 |
| CN | 103427887 A | 12/2013 |
| CN | 103580818 A | 2/2014 |
| CN | 103974320 A | 8/2014 |
| CN | 108601084 A | 9/2018 |

OTHER PUBLICATIONS

Samsung et al.,"WF for Open Issues on CSI Reporting",3GPP TSG-RAN WG1 NR-AH3 R1-1716901, Nagoya, Japan, 18th Sep. 21, 2017,total 19 pages.

Nokia et al.,"Remaining details for Type I and Type II CSI reporting",3GPP TSG HAN WG1 Meeting AH 1801 R1-1800754,Vancouver, Canada, Jan. 22, 26, 2018,total 6 pages.

* cited by examiner

CHANNEL MEASUREMENT METHOD

CROSS-REFERENCE TO RELATED APPLICATIONS

This application is a continuation of International Application No. PCT/CN2018/103955, filed on Sep. 4, 2018, which claims priority to Chinese Patent Application No. 201710915057.8, filed on Sep. 30, 2017. The disclosures of the aforementioned applications are hereby incorporated by reference in their entireties.

TECHNICAL FIELD

Embodiments of the present invention relate to channel measurement technologies, and in particular, to a channel measurement method.

BACKGROUND

Obtaining channel state information (CSI) through channel measurement is crucial to improving transmission quality of wireless communication. During channel measurement, a receive end device (for example, user equipment such as a smartphone) obtains channel state information based on a reference signal (RS) transmitted by a transmit end device (for example, an access device such as a base station), and feeds back obtained CSI to the transmit end device. The transmit end device processes a transmit signal based on the CSI and sends the processed transmit signal to the receive end device. It can be learned that CSI-based wireless transmission is more compatible with a channel environment. Therefore, transmission quality is better.

Usually, the CSI may be sent from the receive end device to the transmit end device on a physical uplink shared channel (PUSCH). The CSI transmitted on the PUSCH may include wideband CSI, or may include a plurality of pieces of subband CSI, or may include both wideband CSI and a plurality of pieces of subband CSI. The wideband CSI may be understood as CSI obtained through calculation based on a wideband, and the subband CSI may be understood as CSI obtained through calculation based on a subband. The wideband described herein may be, for example, but is not limited to, an entire system bandwidth, or a bandwidth corresponding to one radio frequency carrier, or may be an entire block of bandwidth. The entire block of bandwidth includes a plurality of subbands, and an example of the entire block of bandwidth may be a to-be-measured bandwidth to be described below. A wideband may be divided into a plurality of subbands, and a width of the subband may be set based on, for example, but not limited to, a specific system design requirement. When there is a relatively large amount of subband CSI that needs to be fed back, very high overheads are caused.

Therefore, a technical solution is required, to reduce feedback overheads of the subband CSI.

SUMMARY

In view of this, it is indeed necessary to provide a channel measurement solution, to reduce feedback overheads of subband CSI.

In one embodiment, a channel measurement method is provided. The method includes:

obtaining, for a to-be-measured frequency band including at least one reporting subband and at least one missing subband, channel state information of each reporting subband and channel state information of each missing subband, where the channel state information of each reporting subband is obtained based on channel estimation, and the channel state information of each missing subband is obtained according to a reference rule with reference to channel state information of a reporting subband that is indicated by the reference rule and that is in the at least one reporting subband; and sending a measurement report of the to-be-measured frequency band to a transmit end device, where the measurement report includes the channel state information of each reporting subband in the at least one reporting subband, so that the transmit end device obtains, for each missing subband, channel state information of the missing subband according to the reference rule with reference to the channel state information of the reporting subband that is indicated by the reference rule and that is in the at least one reporting subband.

In one embodiment, the method further includes:

receiving missing subband indication information from the transmit end device, where the missing subband indication information is used to indicate the at least one missing subband; and determining the at least one missing subband based on the missing subband indication information.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the method further includes:

receiving missing subband configuration information from the transmit end device, where the missing subband configuration information includes a plurality of missing subband configuration solutions, and each configuration solution records a plurality of missing subbands; and determining the plurality of missing subband configuration solutions based on the missing subband configuration information.

In one embodiment, the method further includes:

receiving reference rule indication information from the transmit end device, where the reference rule indication information is used to indicate the reference rule, and the reference rule is one of a plurality of reference rules; and determining the reference rule based on the reference rule indication information.

In one embodiment, the method further includes:

receiving reference rule configuration information from the transmit end device, where the reference rule configuration information includes the plurality of reference rules; and determining the plurality of reference rules based on the reference rule configuration information.

In one embodiment, the method further includes:

calculating channel-related information based on a channel state information group, where the channel state information group includes at least channel state information of at least one missing subband in the at least one missing subband; and sending the channel-related information to the transmit end device.

In one embodiment, the channel-related information is included in the measurement report, and the sending the channel-related information to the transmit end device is the sending a measurement report of the to-be-measured frequency band to a transmit end device.

In one embodiment, the channel state information is one of the following information:

a channel quality indicator, a precoding matrix indicator, a rank indication, and a channel state information-reference signal resource indicator.

In one embodiment, the channel-related information includes at least one of the following information: channel state information of the to-be-measured frequency band, other channel state information of the subband, and other information of the subband.

In one embodiment, a receive end device is provided. The device includes:

a processing module, configured to obtain, for a to-be-measured frequency band including at least one reporting subband and at least one missing subband, channel state information of each reporting subband and channel state information of each missing subband, where the channel state information of each reporting subband is obtained based on channel estimation, and the channel state information of each missing subband is obtained according to a reference rule with reference to channel state information of a reporting subband that is indicated by the reference rule and that is in the at least one reporting subband; and a transceiver module, configured to send a measurement report of the to-be-measured frequency band to a transmit end device, where the measurement report includes the channel state information of each reporting subband in the at least one reporting subband, so that the transmit end device obtains, for each missing subband, channel state information of the missing subband according to the reference rule with reference to the channel state information of the reporting subband that is indicated by the reference rule and that is in the at least one reporting subband.

In one embodiment, the transceiver module is further configured to receive missing subband indication information from the transmit end device, where the missing subband indication information is used to indicate the at least one missing subband; and the processing module is further configured to determine the at least one missing subband based on the missing subband indication information.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the transceiver module is further configured to receive missing subband configuration information from the transmit end device, where the missing subband configuration information includes a plurality of missing subband configuration solutions, and each configuration solution records a plurality of missing subbands; and the processing module is further configured to determine the plurality of missing subband configuration solutions based on the missing subband configuration information.

In one embodiment, the transceiver module is further configured to receive reference rule indication information from the transmit end device, where the reference rule indication information is used to indicate the reference rule, and the reference rule is one of a plurality of reference rules; and the processing module is further configured to determine the reference rule based on the reference rule indication information.

In one embodiment, the transceiver module is further configured to receive reference rule configuration information from the transmit end device, where the reference rule configuration information includes the plurality of reference rules; and the processing module is further configured to determine the plurality of reference rules based on the reference rule configuration information.

In one embodiment, the processing module is further configured to calculate channel-related information based on a channel state information group, where the channel state information group includes at least channel state information of at least one missing subband in the at least one missing subband; and the transceiver module is further configured to send the channel-related information to the transmit end device.

In one embodiment, the channel-related information is included in the measurement report, and the sending the channel-related information to the transmit end device is the sending a measurement report of the to-be-measured frequency band to a transmit end device.

In one embodiment, the channel state information is one of the following information:

a channel quality indicator, a precoding matrix indicator, a rank indication, and a channel state information-reference signal resource indicator.

In one embodiment, the channel-related information includes at least one of the following information: channel state information of the to-be-measured frequency band, other channel state information of the subband, and other information of the subband.

In one embodiment, the processing module is a processor, and the transceiver module is a transceiver.

In one embodiment, a channel measurement method is provided. The method includes:

receiving a measurement report of a to-be-measured frequency band from a receive end device, where the to-be-measured frequency band includes at least one reporting subband and at least one missing subband, the measurement report includes channel state information of each reporting subband in the at least one reporting subband, and the channel state information of each reporting subband is obtained by the receive end device based on channel estimation; and obtaining, for each missing subband, channel state information of the missing subband according to a reference rule with reference to channel state information of a reporting subband that is indicated by the reference rule and that is in the at least one reporting subband.

In one embodiment, the method further includes:

generating missing subband indication information, where the missing subband indication information is used to indicate the at least one missing subband; and sending the missing subband indication information to the receive end device.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the method further includes:

generating missing subband configuration information, where the missing subband configuration information includes a plurality of missing subband configuration solutions, and each configuration solution records a plurality of missing subbands; and sending the missing subband configuration information to the receive end device.

In one embodiment, the method further includes:

generating reference rule indication information, where the reference rule indication information is used to indicate the reference rule, and the reference rule is one of a plurality of reference rules; and sending the reference rule indication information to the receive end device.

In one embodiment, the method further includes:

generating reference rule configuration information, where the reference rule configuration information includes the plurality of reference rules; and sending the reference rule configuration information to the receive end device.

In one embodiment, the method further includes:

receiving channel-related information from the receive end device, where the channel-related information is obtained through calculation based on a channel state information group, and the channel state information group includes at least channel state information of at least one missing subband in the at least one missing subband.

In one embodiment, the channel-related information is included in the measurement report, and the sending the channel-related information to the transmit end device is the sending a measurement report of the to-be-measured frequency band to a transmit end device.

In one embodiment, the channel state information is one of the following information:

a channel quality indicator, a precoding matrix indicator, a rank indication, and a channel state information-reference signal resource indicator.

In one embodiment, the channel-related information includes at least one of the following information: channel state information of the to-be-measured frequency band, other channel state information of the subband, and other information of the subband.

In one embodiment, a transmit end device is provided. The device includes:

a transceiver module, configured to receive a measurement report of a to-be-measured frequency band from a receive end device, where the to-be-measured frequency band includes at least one reporting subband and at least one missing subband, the measurement report includes channel state information of each reporting subband in the at least one reporting subband, and the channel state information of each reporting subband is obtained by the receive end device based on channel estimation; and a processing module, configured to obtain, for each missing subband, channel state information of the missing subband according to a reference rule with reference to channel state information of a reporting subband that is indicated by the reference rule and that is in the at least one reporting subband.

In one embodiment, the processing module is further configured to generate missing subband indication information, where the missing subband indication information is used to indicate the at least one missing subband; and the transceiver module is further configured to send the missing subband indication information to the receive end device.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the processing module is further configured to generate missing subband configuration information, where the missing subband configuration information includes a plurality of missing subband configuration solutions, and each configuration solution records a plurality of missing subbands; and the transceiver module is further configured to send the missing subband configuration information to the receive end device.

In one embodiment, the processing module is further configured to generate reference rule indication information, where the reference rule indication information is used to indicate the reference rule, and the reference rule is one of a plurality of reference rules; and the transceiver module is further configured to send the reference rule indication information to the receive end device.

In one embodiment, the processing module is further configured to generate reference rule configuration information, where the reference rule configuration information includes the plurality of reference rules; and the transceiver module is further configured to send the reference rule configuration information to the receive end device.

In one embodiment, the transceiver module is further configured to receive channel-related information from the receive end device, where the channel-related information is obtained through calculation based on a channel state information group, and the channel state information group includes at least channel state information of at least one missing subband in the at least one missing subband.

In one embodiment, the channel-related information is included in the measurement report, and the sending the channel-related information to the transmit end device is the sending a measurement report of the to-be-measured frequency band to a transmit end device.

In one embodiment, the channel state information is one of the following information:

a channel quality indicator, a precoding matrix indicator, a rank indication, and a channel state information-reference signal resource indicator.

In one embodiment, the channel-related information includes at least one of the following information: channel state information of the to-be-measured frequency band, other channel state information of the subband, and other information of the subband.

In one embodiment, the processing module is a processor, and the transceiver module is a transceiver.

In one embodiment, an uplink control information sending method is provided. The method includes:

generating uplink control information, where the uplink control information includes a first part and a second part, and the first part and the second part are independently encoded; a quantity of information bits corresponding to the first part is fixed, and the first part includes information for indicating a quantity of information bits corresponding to the second part; and the second part includes channel state information of M subbands of a to-be-measured frequency band, and the to-be-measured frequency band includes N subbands, where $1 \leq M \leq N$; and sending the uplink control information to a transmit end device.

In one embodiment, the first part includes channel state information of the to-be-measured frequency band.

In one embodiment, the channel state information of the M subbands belongs to a same type, and the channel state information is one of the following information:

a channel quality indicator, a precoding matrix indicator, a rank indication, and a channel state information-reference signal resource indicator.

In one embodiment, the channel state information of the to-be-measured frequency band is one of the following information:

a channel quality indicator, a precoding matrix indicator, a rank indication, and a channel state information-reference signal resource indicator.

In one embodiment, a receive end device is provided. The device includes:

a processing module, configured to generate uplink control information, where the uplink control information includes a first part and a second part, and the first part and the second part are independently encoded; a quantity of information bits corresponding to the first part is fixed, and the first part includes information for indicating a quantity of information bits corresponding to the second part; and the second part includes channel state information of M subbands of a to-be-measured frequency band, and the to-be-measured frequency band includes N subbands, where 1≤M≤N; and a transceiver module, configured to send the uplink control information to a transmit end device.

In one embodiment, the first part includes channel state information of the to-be-measured frequency band.

In one embodiment, the channel state information of the M subbands belongs to a same type, and the channel state information is one of the following information:

a channel quality indicator, a precoding matrix indicator, a rank indication, and a channel state information-reference signal resource indicator.

In one embodiment, the channel state information of the to-be-measured frequency band is one of the following information:

a channel quality indicator, a precoding matrix indicator, a rank indication, and a channel state information-reference signal resource indicator.

In one embodiment, the processing module is a processor, and the transceiver module is a transceiver.

In one embodiment, an uplink control information receiving method is provided. The method includes:

receiving uplink control information, where the uplink control information includes a first part and a second part, and the first part and the second part are independently encoded; a quantity of information bits corresponding to the first part is fixed, and the first part includes information for indicating a quantity of information bits corresponding to the second part; and the second part includes channel state information of M subbands of a to-be-measured frequency band, and the to-be-measured frequency band includes N subbands, where 1≤M≤N; and determining the channel state information of the M subbands of the to-be-measured frequency band based on the uplink control information.

In one embodiment, the first part includes channel state information of the to-be-measured frequency band.

In one embodiment, the channel state information of the M subbands belongs to a same type, and the channel state information is one of the following information:

a channel quality indicator, a precoding matrix indicator, a rank indication, and a channel state information-reference signal resource indicator.

In one embodiment, the channel state information of the to-be-measured frequency band is one of the following information:

a channel quality indicator, a precoding matrix indicator, a rank indication, and a channel state information-reference signal resource indicator.

In one embodiment, a transmit end device is provided. The device includes:

a transceiver module, configured to receive uplink control information, where the uplink control information includes a first part and a second part, and the first part and the second part are independently encoded; a quantity of information bits corresponding to the first part is fixed, and the first part includes information for indicating a quantity of information bits corresponding to the second part; and the second part includes channel state information of M subbands of a to-be-measured frequency band, and the to-be-measured frequency band includes N subbands, where 1≤M≤N; and a processing module, configured to determine the channel state information of the M subbands of the to-be-measured frequency band based on the uplink control information.

In one embodiment, the first part includes channel state information of the to-be-measured frequency band.

In one embodiment, the channel state information of the M subbands belongs to a same type, and the channel state information is one of the following information:

a channel quality indicator, a precoding matrix indicator, a rank indication, and a channel state information-reference signal resource indicator.

In one embodiment, the channel state information of the to-be-measured frequency band is one of the following information:

a channel quality indicator, a precoding matrix indicator, a rank indication, and a channel state information-reference signal resource indicator.

In one embodiment, the processing module is a processor, and the transceiver module is a transceiver.

In one embodiment, a missing subband indication method is provided. The method includes:

receiving missing subband indication information from a transmit end device, where the missing subband indication information is used to indicate at least one missing subband; and determining the at least one missing subband based on the missing subband indication information.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the method further includes:

receiving missing subband configuration information from the transmit end device, where the missing subband configuration information includes a plurality of missing subband configuration solutions, and each configuration solution records a plurality of missing subbands; and determining the plurality of missing subband configuration solutions based on the missing subband configuration information. In one embodiment, the missing subband indication information is physical layer signaling, and the missing subband configuration information is media access control layer signaling or radio resource control signaling.

In one embodiment, a missing subband configuration method is provided. The method includes:

receiving missing subband configuration information from a transmit end device, where the missing subband configuration information includes a plurality of missing subband configuration solutions, and each configuration solution records a plurality of missing subbands; and determining the plurality of missing subband configuration solutions based on the missing subband configuration information.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the method further includes:

receiving missing subband indication information from the transmit end device, where the missing subband indication information is used to indicate at least one missing subband; and determining the at least one missing subband based on the missing subband indication information.

In one embodiment, the missing subband indication information is physical layer signaling, and the missing subband configuration information is media access control layer signaling or radio resource control signaling.

In one embodiment, a reference rule indication method is provided. The method includes:

receiving reference rule indication information from a transmit end device, where the reference rule indication information is used to indicate a reference rule, and the reference rule is one of a plurality of reference rules; and determining the reference rule based on the reference rule indication information.

In one embodiment, the method further includes:

receiving reference rule configuration information from the transmit end device, where the reference rule configuration information includes the plurality of reference rules; and determining the plurality of reference rules based on the reference rule configuration information. In one embodiment, the reference rule indication information is physical layer signaling, and the reference rule configuration information is media access control layer signaling or radio resource control signaling.

In one embodiment, a reference rule configuration method is provided. The method includes:

receiving reference rule configuration information from a transmit end device, where the reference rule configuration information includes a plurality of reference rules; and determining the plurality of reference rules based on the reference rule configuration information.

In one embodiment, the method further includes:

receiving reference rule indication information from the transmit end device, where the reference rule indication information is used to indicate the reference rule, and the reference rule is one of the plurality of reference rules; and determining the reference rule based on the reference rule indication information.

In one embodiment, the reference rule indication information is physical layer signaling, and the reference rule configuration information is media access control layer signaling or radio resource control signaling.

In one embodiment, a missing subband indication method is provided. The method includes:

generating missing subband indication information, where the missing subband indication information is used to indicate at least one missing subband; and sending the missing subband indication information to a receive end device.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the method further includes:

generating missing subband configuration information, where the missing subband configuration information includes a plurality of missing subband configuration solutions, and each configuration solution records a plurality of missing subbands; and sending the missing subband configuration information to the receive end device.

In one embodiment, the missing subband indication information is physical layer signaling, and the missing subband configuration information is media access control layer signaling or radio resource control signaling.

In one embodiment, a missing subband configuration method is provided. The method includes:

generating missing subband configuration information, where the missing subband configuration information includes a plurality of missing subband configuration solutions, and each configuration solution records a plurality of missing subbands; and sending the missing subband indication information to a receive end device.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the method further includes:

generating missing subband indication information, where the missing subband indication information is used to indicate at least one missing subband; and sending the missing subband indication information to the receive end device.

In one embodiment, the missing subband indication information is physical layer signaling, and the missing subband configuration information is media access control layer signaling or radio resource control signaling.

In one embodiment, a reference rule indication method is provided. The method includes:

generating reference rule indication information, where the reference rule indication information is used to indicate a reference rule, and the reference rule is one of a plurality of reference rules; and sending the reference rule indication information to a receive end device.

In one embodiment, the method further includes:

generating reference rule configuration information, where the reference rule configuration information includes the plurality of reference rules; and sending the reference rule configuration information to the receive end device.

In one embodiment, the reference rule indication information is physical layer signaling, and the reference rule configuration information is media access control layer signaling or radio resource control signaling.

In one embodiment, a reference rule configuration method is provided. The method includes:

generating reference rule configuration information, where the reference rule configuration information includes a plurality of reference rules; and sending the reference rule configuration information to a receive end device.

In one embodiment, the method further includes:

generating reference rule indication information, where the reference rule indication information is used to indicate the reference rule, and the reference rule is one of the plurality of reference rules; and sending the reference rule indication information to the receive end device.

In one embodiment, the reference rule indication information is physical layer signaling, and the reference rule configuration information is media access control layer signaling or radio resource control signaling.

In one embodiment, a receive end device is provided. The device includes:

a transceiver module, configured to receive missing subband indication information from a transmit end device, where the missing subband indication information is used to indicate at least one missing subband; and a processing module, configured to determine the at least one missing subband based on the missing subband indication information.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the transceiver module is further configured to receive missing subband configuration information from the transmit end device, where the missing subband configuration information includes a plurality of missing subband configuration solutions, and each configuration solution records a plurality of missing subbands; and the processing module is further configured to determine the plurality of missing subband configuration solutions based on the missing subband configuration information. In one embodiment, the missing subband indication information is physical layer signaling, and the missing subband configuration information is media access control layer signaling or radio resource control signaling.

In one embodiment, the transceiver module is a transceiver, and the processing module is a processor.

In one embodiment, a receive end device is provided. The device includes:

a transceiver module, configured to receive missing subband configuration information from a transmit end device, where the missing subband configuration information includes a plurality of missing subband configuration solutions, and each configuration solution records a plurality of missing subbands; and a processing module, configured to determine the plurality of missing subband configuration solutions based on the missing subband configuration information.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the transceiver module is further configured to receive missing subband indication information from the transmit end device, where the missing subband indication information is used to indicate at least one missing subband; and the processing module is further configured to determine the at least one missing subband based on the missing subband indication information.

In one embodiment, the missing subband indication information is physical layer signaling, and the missing subband configuration information is media access control layer signaling or radio resource control signaling.

In one embodiment, the transceiver module is a transceiver, and the processing module is a processor.

In one embodiment, a receive end device is provided. The device includes:

a transceiver module, configured to receive reference rule indication information from a transmit end device, where the reference rule indication information is used to indicate a reference rule, and the reference rule is one of a plurality of reference rules; and a processing module, configured to determine the reference rule based on the reference rule indication information.

In one embodiment, the transceiver module is further configured to receive reference rule configuration information from the transmit end device, where the reference rule configuration information includes the plurality of reference rules; and the processing module is further configured to determine the plurality of reference rules based on the reference rule configuration information. In one embodiment, the reference rule indication information is physical layer signaling, and the reference rule configuration information is media access control layer signaling or radio resource control signaling.

In one embodiment, the transceiver module is a transceiver, and the processing module is a processor.

In one embodiment, a receive end device is provided. The device includes:

a transceiver module, configured to receive reference rule configuration information from a transmit end device, where the reference rule configuration information includes a plurality of reference rules; and a processing module, configured to determine the plurality of reference rules based on the reference rule configuration information.

In one embodiment, the transceiver module is further configured to receive reference rule indication information from the transmit end device, where the reference rule indication information is used to indicate the reference rule, and the reference rule is one of the plurality of reference rules; and the processing module is further configured to determine the reference rule based on the reference rule indication information.

In one embodiment, the reference rule indication information is physical layer signaling, and the reference rule configuration information is media access control layer signaling or radio resource control signaling.

In one embodiment, the transceiver module is a transceiver, and the processing module is a processor.

In one embodiment, a transmit end device is provided. The device includes:

a processing module, configured to generate missing subband indication information, where the missing subband indication information is used to indicate at least one missing subband; and a transceiver module, configured to send the missing subband indication information to a receive end device.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the processing module is further configured to generate missing subband configuration information, where the missing subband configuration information includes a plurality of missing subband configuration solutions, and each configuration solution records a plurality of missing subbands; and the transceiver module is further configured to send the missing subband configuration information to the receive end device.

In one embodiment, the missing subband indication information is physical layer signaling, and the missing subband configuration information is media access control layer signaling or radio resource control signaling.

In one embodiment, the transceiver module is a transceiver, and the processing module is a processor.

In one embodiment, a transmit end device is provided. The device includes:

a processing module, configured to generate missing subband configuration information, where the missing subband configuration information includes a plurality of missing subband configuration solutions, and each configuration solution records a plurality of missing subbands; and a transceiver module, configured to send the missing subband configuration information to a receive end device.

In one embodiment, the missing subband indication information is used to indicate the at least one missing subband one by one, or the missing subband indication information is used to indicate a missing subband configuration solution, where the missing subband configuration solution records the at least one missing subband.

In one embodiment, the processing module is further configured to generate missing subband indication information, where the missing subband indication information is used to indicate at least one missing subband; and the transceiver module is further configured to send the missing subband indication information to the receive end device.

In one embodiment, the missing subband indication information is physical layer signaling, and the missing subband configuration information is media access control layer signaling or radio resource control signaling.

In one embodiment, the transceiver module is a transceiver, and the processing module is a processor.

In one embodiment, a transmit end device is provided. The device includes:

a processing module, configured to generate reference rule indication information, where the reference rule indication information is used to indicate a reference rule, and the reference rule is one of a plurality of reference rules; and a transceiver module, configured to send the reference rule indication information to a receive end device.

In one embodiment, the processing module is further configured to generate reference rule configuration information, where the reference rule configuration information includes the plurality of reference rules; and the transceiver module is further configured to send the reference rule configuration information to the receive end device.

In one embodiment, the reference rule indication information is physical layer signaling, and the reference rule configuration information is media access control layer signaling or radio resource control signaling.

In one embodiment, the transceiver module is a transceiver, and the processing module is a processor.

In one embodiment, a transmit end device is provided. The device includes:

a processing module, configured to generate reference rule configuration information, where the reference rule configuration information includes a plurality of reference rules; and a transceiver module, configured to send the reference rule configuration information to a receive end device.

In one embodiment, the processing module is further configured to generate reference rule indication information, where the reference rule indication information is used to indicate the reference rule, and the reference rule is one of the plurality of reference rules; and the transceiver module is further configured to send the reference rule indication information to the receive end device.

In one embodiment, the reference rule indication information is physical layer signaling, and the reference rule configuration information is media access control layer signaling or radio resource control signaling.

In one embodiment, the transceiver module is a transceiver, and the processing module is a processor.

In one embodiment, a processor is provided. The processor is configured to perform any one of the foregoing methods, and operations related to transmission and receiving should be understood as being performed by the processor by using a transceiver.

In one embodiment, a processing apparatus is provided. The apparatus includes:

a memory; and a processor, configured to read an instruction stored in the memory, to perform any one of the foregoing methods, operations related to transmission and receiving should be understood as being performed by the processor by using a transceiver.

The memory may be a non-transitory memory such as a read-only memory (ROM). The memory and the processor may be integrated on a same chip, or may be separately disposed on different chips. A type of the memory and a manner of disposing the memory and the processor are not limited in the embodiments of the present invention.

In one embodiment, a computer-readable storage medium is provided. The computer-readable storage medium includes an instruction, and when the instruction is run on a computer, the computer is enabled to perform any one of the foregoing methods.

The computer-readable storage medium is non-transitory (non-transitory).

In one embodiment, a computer program product including an instruction is provided, and when the computer program product is run on a computer, the computer is enabled to perform any one of the foregoing methods.

Compared with feeding back a measurement report that includes channel state information of each subband, the measurement report including channel state information of only some subbands is fed back in this embodiment of the present invention, thereby helping reduce feedback overheads brought by channel measurement. In addition, for channel state information of other subbands, the receive end device and the transmit end device generate channel state information of each subband in the other subbands based on a same rule and according to channel state information of a subband indicated by the rule in the some subbands, thereby helping implement consistency of the channel state information between the receive end device and the transmit end device, and avoiding adverse impact on a transmission effect.

DESCRIPTION OF EMBODIMENTS

A next generation wireless communications system being developed currently may also be referred to as a new radio (NR) system or a 5G system. A latest research progress of a next generation wireless communication standard indicates that CSI may be sent from a receive end device to a transmit end device on a physical uplink shared channel (PUSCH). A person skilled in the art should understand that compared with a physical uplink control channel (PUCCH) mainly used to transmit control information, the PUSCH is mainly used to transmit data. Therefore, during CSI transmission, the PUSCH may further transmit data or may not transmit data. For example, a PUSCH in an uplink subframe may transmit both CSI and data, or may transmit only CSI but not transmit data. The CSI is usually included in uplink control information (UCI), and the UCI is transmitted on the PUSCH. The UCI may further include at least two parts. A quantity of information bits included in a first part is fixed, and the first part is used to indicate a quantity of information bits in a second part. In addition, a priority of the first part is higher than that of the second part. Still further, the first part and the second part may be separately independently encoded. A person skilled in the art should understand that a finally determined next generation wireless communication standard may further be changed. Therefore, the finally determined next generation wireless communication standard may be different from that in the foregoing latest research progress.

Figure 1:
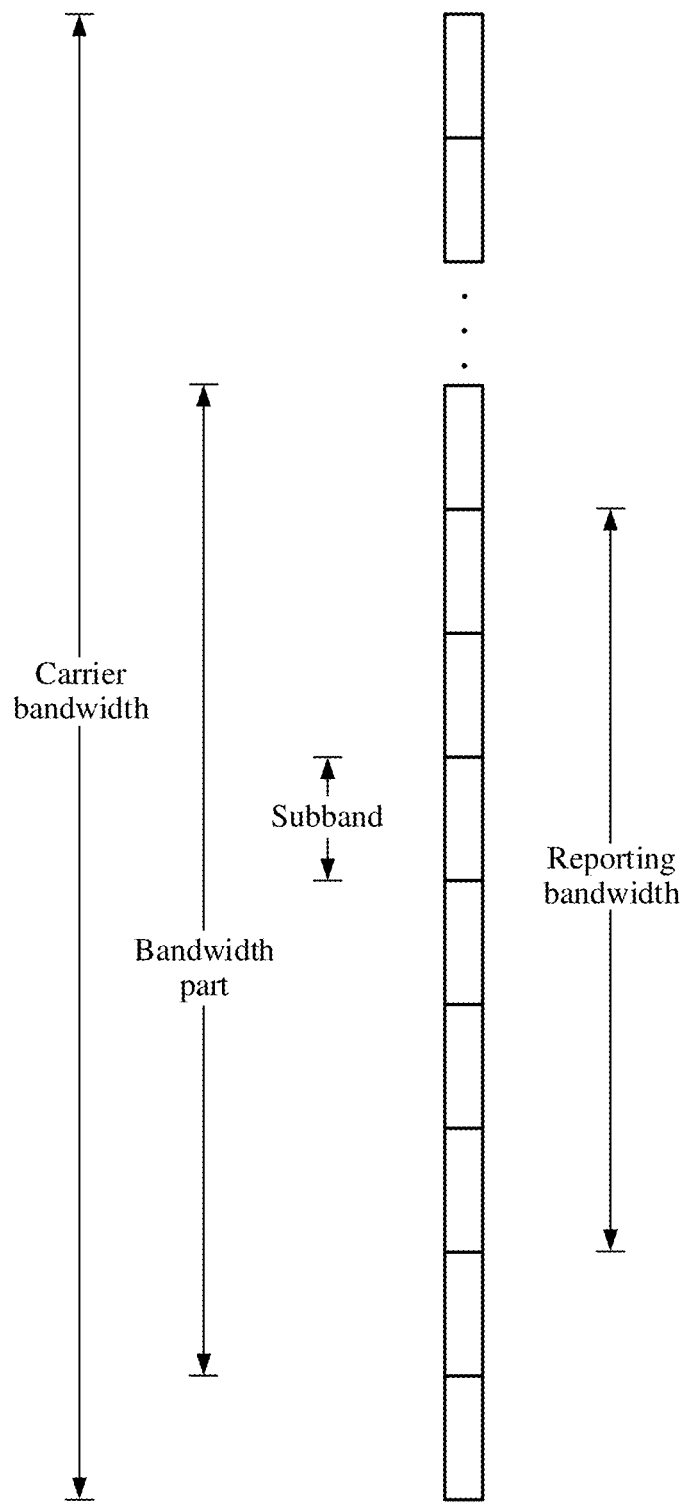
FIG. 1 is a schematic diagram of frequency band division according to an embodiment of the present invention.

FIG. 1 is a schematic diagram of frequency band division according to an embodiment of the present invention. As shown in FIG. 1, a carrier bandwidth may be considered as a wideband, and the carrier bandwidth further includes at least one bandwidth part. Each bandwidth part includes at least one continuous subband, and each subband further includes a plurality of continuous subcarriers.

Each bandwidth part may correspond to a group of system parameters (numerology), including, for example, but not limited to, a subcarrier spacing and a cyclic prefix (CP). Different bandwidth parts may correspond to different system parameters. In one embodiment, in a same transmission time interval (TTI), in a plurality of bandwidth parts, only one bandwidth part may be available and other bandwidth parts are unavailable.

During CSI reporting, some or all subbands of a bandwidth part may be assigned to serve as a CSI reporting bandwidth, to report CSI corresponding to the CSI reporting bandwidth. For ease of description, the CSI reporting bandwidth is briefly referred to as a reporting bandwidth below. It is not difficult to understand that the reporting bandwidth is a section of bandwidth, the CSI corresponding to the bandwidth needs to be reported, and the bandwidth includes a plurality of subbands. The reporting bandwidth carries a reference signal for performing channel measurement that is sent by a transmit end device, for example, but not limited to, a cell-specific reference signal (CRS), a channel state information-reference signal (CSI-RS), or a demodulation reference signal (DMRS). The foregoing technical content related to the reference signals belongs to the prior art, and is not limited in this embodiment of this application. A receive end device may measure the foregoing reference signals to obtain corresponding CSI. During CSI reporting, CSI of the entire reporting bandwidth, that is, wideband CSI of the reporting bandwidth may be reported, or CSI of at least one subband in the reporting bandwidth may be reported. The foregoing two reporting manners may be further combined and used, or another reporting manner is used. As shown in FIG. 1, the reporting bandwidth includes a plurality of continuous subbands. However, in one embodiment, subbands included in the reporting bandwidth may be discontinuous. For example, for six continuous subbands in a bandwidth part: a subband 1 to a subband 6, the reporting bandwidth may include the subband 1, the subband 2, the subband 4, and the subband 6. In one embodiment, a frequency band may alternatively be divided in another manner or by using levels. For example, in different division manners, quantities of subcarriers included in subbands may be different. For another example, at least one level may be added or deleted between frequency band division levels shown in FIG. 1. A specific frequency band division manner is not limited in this embodiment of the present invention.

As described in the part of the background, during channel measurement, the receive end device obtains the channel state information based on the reference signal (RS) transmitted by the transmit end device, and feeds back the obtained CSI to the transmit end device. The transmit end device may process a transmit signal based on the CSI, and sends the processed transmit signal to the receive end device. In one embodiment, the CSI may further include, for example, but is not limited to, at least one of the following information: a channel quality indicator (CQI), a precoding matrix indicator (PMI), a CSI-RS resource indicator (CRI), and a rank indication (RI). When processing the transmit signal, the transmit end device may perform processing by directly using CSI fed back by the receive end device; or the transmit end device may adjust the CSI fed back by the receive end device, and perform processing by using the adjusted CSI. For example, in one embodiment, the transmit end device may decrease an RI fed back by the receive end device, and perform processing by using the decreased RI. For another example, the transmit end device may further reconstruct a precoding matrix corresponding to a PMI fed back by the receive end device, and perform processing by using the reconstructed PMI. The reconstruction process may be, for example, but is not limited to, performing orthogonalization processing on precoding matrices corresponding to PMIs fed back by a plurality of simultaneously scheduled receive end devices. A method for transmitting data by simultaneously scheduling a plurality of receive end devices is also referred to as a multi-user multiple-input multiple-output (MU-MIMO) technology. For still another example, the transmit end device may further decrease a CQI fed back by the receive end device, and perform processing by using the decreased CQI. It should be noted that if the transmit end device adjusts the CSI fed back by the receive end device, the transmit end device may need to notify the receive end device of the adjusted CSI, so that the receive end device restores the transmit signal from a received signal based on the adjusted CSI. For example, if a base station adjusts an RI or a CQI, the base station needs to notify the receive end device of the adjusted RI or the adjusted CQI. In one embodiment, a specific manner of adjusting, by the transmit end device, the CSI fed back by the receive end device is not limited in this embodiment of the present invention.

As described in the part of the background, when a relatively large amount of subband CSI needs to be fed back, very high overheads are caused. Embodiments of the present invention provide a technical solution, to help reduce the foregoing overheads. The technical solution provided in the embodiments of the present invention is described in detail with reference to the accompanying drawings and specific embodiments.

Figure 2:
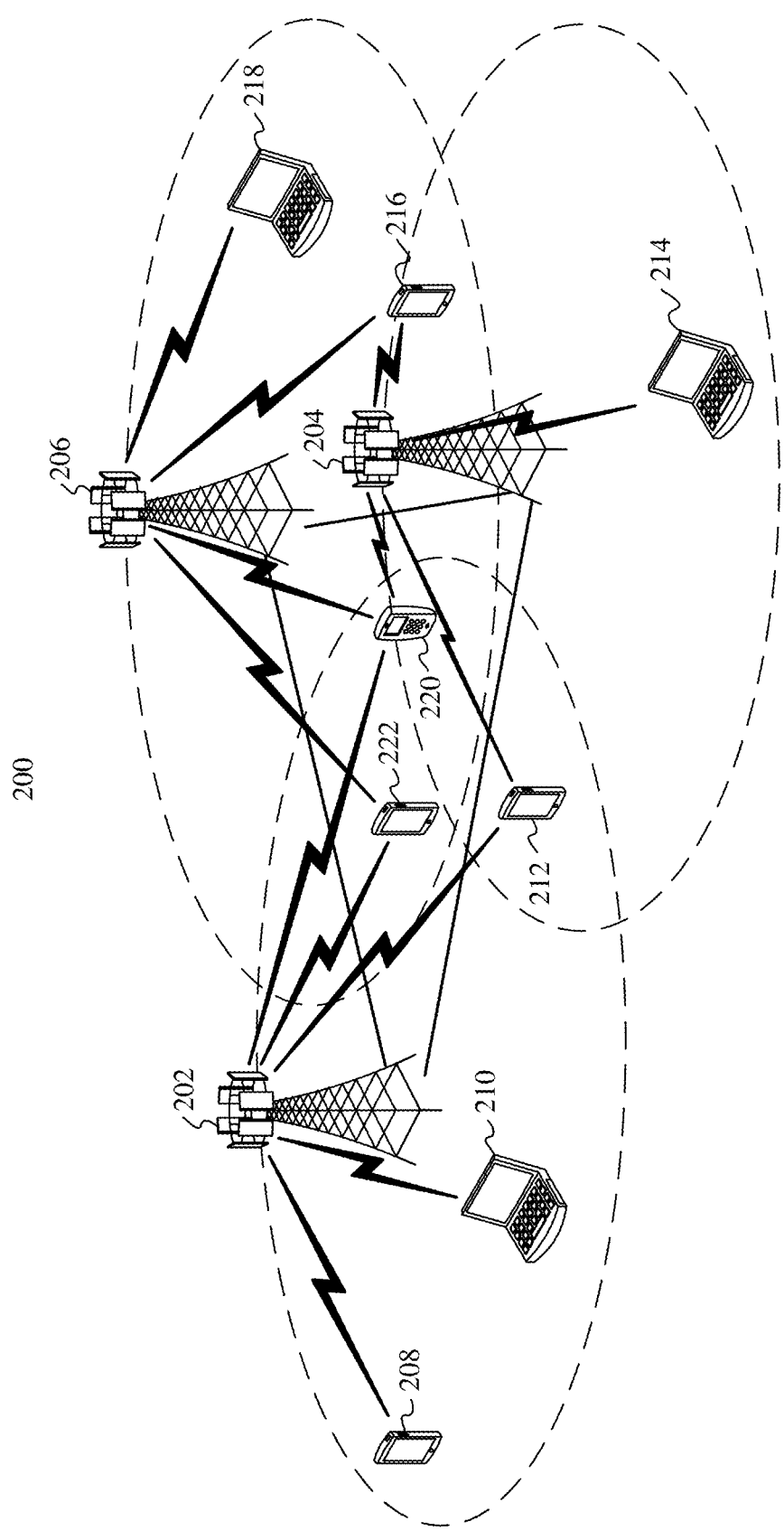
FIG. 2 is an example of a schematic diagram of a wireless communications network according to an embodiment of the present invention.

FIG. 2 is an example of a schematic diagram of a wireless communications network 200 according to an embodiment of the present invention. As shown in FIG. 2, the wireless communications network 200 includes base stations 202 to 206 and terminal devices 208 to 222. The base stations 202 to 206 may communicate with each other on backhaul links (as indicated by straight lines between the base stations 202 to 206). The backhaul link may be a wired backhaul link (for example, an optical fiber or a copper cable), or may be a wireless backhaul link (for example, microwave). The terminal devices 208 to 222 may communicate with the corresponding base stations 202 to 206 on radio links (as indicated by broken lines between the base stations 202 to 206 and the terminal devices 208 to 222).

The base stations 202 to 206 are usually used as access devices to provide radio access services for the terminal devices 208 to 222 that are usually used as user equipment. Specifically, each base station corresponds to a service coverage area (which may also be referred to as a cell, and is indicated by each oval area in FIG. 2). A terminal device entering the area may communicate with a base station by using a radio signal, to receive a radio access service provided by the base station. Service coverage areas of the base stations may overlap. A terminal device in an overlapping area may receive radio signals from a plurality of base stations. Therefore, these base stations may coordinate with each other, to provide a service for the terminal device. For example, the plurality of base stations may provide the service for the terminal device in the overlapping area by using a coordinated multipoint (CoMP) technology. For example, as shown in FIG. 2, service coverage areas of the base station 202 and the base station 204 overlap, and the terminal device 222 is in the overlapping area. Therefore, the terminal device 222 may receive radio signals from the base station 202 and the base station 204, and the base station 202 and the base station 204 may coordinate with each other, to provide a service for the terminal device 222. For another example, as shown in FIG. 2, there is a common overlapping area among service coverage areas of the base station 202, the base station 204, and the base station 206, and the terminal device 220 is in the overlapping area. Therefore, the terminal device 220 may receive radio signals from the base stations 202, 204, and 206, and the base stations 202, 204, and 206 may coordinate with each other, to provide a service for the terminal device 220.

Depending on a wireless communications technology in use, the base station may also be referred to as a NodeB, an evolved NodeB (eNodeB), an access point (AP), or the like. In addition, based on sizes of coverage areas in which a service is provided, the base station may also be classified into a macro base station for providing a macro cell, a micro base station for providing a micro cell (Pico cell), a femto base station for providing a femto cell, and the like. With continuous evolution of wireless communications technologies, another name may also be used for a future base station.

The terminal devices 208 to 222 may be various wireless communications devices having a wireless communication function, for example, but not limited to, a mobile cellular phone, a cordless phone, a personal digital assistant (PDA), a smartphone, a notebook computer, a tablet computer, a wireless data card, a wireless modem (Modem), or a wearable device such as a smartwatch. As internet of things (IOT) technologies emerges, increasingly more devices that previously do not have a communication function, for example, but not limited to, a household appliance, a transportation vehicle, a tool device, a service device, and a service facility, start to obtain a wireless communication function by being configured with a wireless communications unit. In this way, these devices can access a wireless communications network and accept remote control. This type of device has the wireless communication function because of being configured with a wireless communications unit. Therefore, this type of device is also a type of wireless communications device. In addition, the terminal devices 208 to 222 may also be referred to as mobile consoles, mobile devices, mobile terminals, wireless terminals, handheld devices, clients, and the like.

The base stations 202 to 206 and the terminal devices 208 to 222 may each be configured with a plurality of antennas, to support a MIMO technology. Further, the base stations 202 to 206 and the terminal devices 208 to 222 may not only support a single-user MIMO (SU-MIMO) technology, but also support a multi-user MIMO (MU-MIMO) technology. The MU-MIMO may be implemented based on a space division multiple access (SDMA) technology. Configured with a plurality of antennas, the base stations 202 to 206 and the terminal devices 208 to 222 may further flexibly support a single-input single-output (SISO) technology, a single-input multiple-output (SIMO) technology, and a multiple-input single-output (MISO) technology, to implement various types of diversity (for example, but not limited to, transmit diversity and receive diversity) and multiplexing technologies. The diversity technology may include, for example, but is not limited to, a transmit diversity (TD) technology and a receive diversity (RD) technology, and the multiplexing technology may be a spatial multiplexing technology. In addition, the foregoing various types of technologies may further include a plurality of solutions. For example, the transmit diversity technology may include, for example, but is not limited to, diversity manners such as a space time transmit diversity (STTD), a space-frequency transmit diversity (SFTD), a time switched transmit diversity (TSTD), a frequency switched transmit diversity (FSTD), an orthogonal transmit diversity (OTD), and a cyclic delay diversity (CDD), and diversity manners obtained by deriving, evolving, and combining the foregoing various types of diversity manners. For example, currently, transmit diversity manners such as space-time block coding (STBC), space frequency block coding (SFBC), and the CDD are used in an LTE standard. A general description of the transmit diversity is provided above by using examples. A person skilled in the art should understand that the transmit diversity is further implemented in a plurality of other manners in addition to those in the foregoing examples. Therefore, the foregoing descriptions should not be understood as limitations on the technical solutions of the present invention, and the technical solutions of the present invention should be understood as applicable to various possible transmit diversity solutions.

In addition, the base stations 202 to 206 and the terminal devices 208 to 222 may communicate with each other by using various wireless communications technologies, for example, but not limited to, a time division multiple access (TDMA) technology, a frequency division multiple access (FDMA) technology, a code division multiple access (CDMA) technology, a time division-synchronous code division multiple access (TD-SCDMA) technology, an orthogonal frequency division multiple access (OFDMA) technology, a single carrier frequency division multiple access (SC-FDMA) technology, and a space division multiple access (SDMA) technology, and evolved and derived technologies of these technologies. As a radio access technology (RAT), the foregoing wireless communications technology is adopted in various wireless communication standards, so that various wireless communications systems (or networks) and evolved systems of these wireless communications systems well known today are constructed. These wireless communications systems include but are not limited to a global system for mobile communications (GSM), CDMA 2000, wideband CDMA (WCDMA), Wi-Fi defined in a 802.22 series standard, worldwide interoperability for microwave access (WiMAX), long term evolution (LTE), and LTE-advanced (LTE-A). Unless otherwise specified, the technical solutions provided in the embodiments of the present invention may be applied to the foregoing various wireless communications technologies and wireless communications systems. In addition, the terms "system" and "network" may be interchanged with each other.

It should be noted that the wireless communications network 200 shown in FIG. 2 is merely used as an example, and is not intended to limit the technical solutions of the present invention. A person skilled in the art should understand that in one embodiment, the wireless communications network 200 may further include another device, and a quantity of base stations and a quantity of terminal devices may be further configured based on a specific requirement.

In one embodiment, access devices such as the base stations 202 to 206 shown in FIG. 2 may be used as transmit end devices, and user equipment such as the terminal devices 208 to 222 shown in FIG. 2 may be used as receive end devices.

Figure 3:
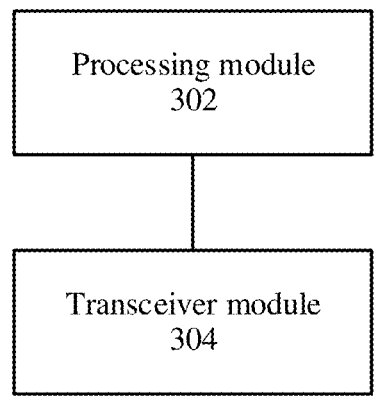
FIG. 3 is an example of a schematic diagram of a logical structure of a communications device according to an embodiment of the present invention.

FIG. 3 is an example of a schematic diagram of a logical structure of a communications device 300 according to an embodiment of the present invention. The communications device 300 may not only be configured to implement a receive end device, but also be configured to implement a transmit end device. As shown in FIG. 3, the communications device 300 includes a processing module 302 and a transceiver module 304. Specific functions of these modules are described in detail below. In one embodiment, the processing module 304 may be implemented by using a processor 402 in a communications device 400 to be described below, or may be implemented by using a processor 402 and a memory 408 in the communications device 400. Certainly, another embodiment may alternatively be used. Similarly, the transceiver module 304 may be implemented by using a transceiver 404 in the communications device 400. Certainly, another embodiment may alternatively be used.

Figure 4:
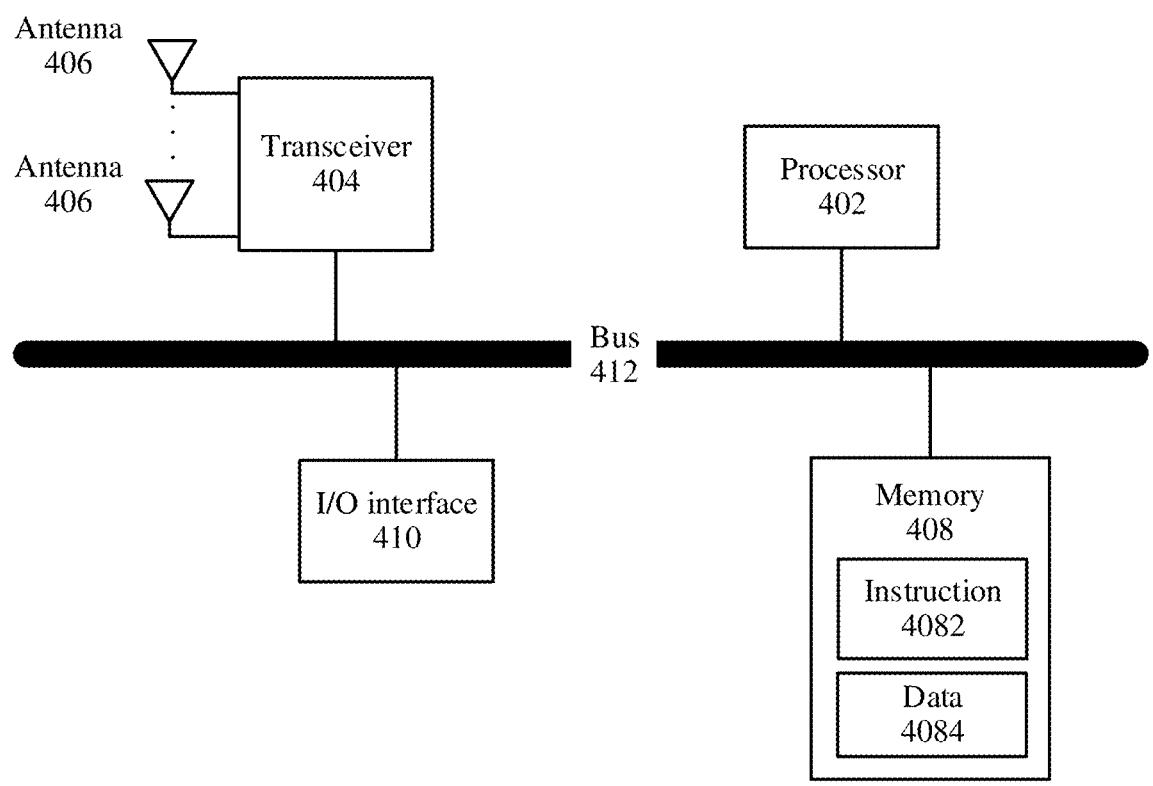
FIG. 4 is an example of a schematic diagram of a hardware structure of a communications device according to an embodiment of the present invention.

FIG. 4 is an example of a schematic diagram of a hardware structure of a communications device 400 according to an embodiment of the present invention. The communications device 400 may not only be configured to implement a receive end device, but also be configured to implement a transmit end device. As shown in FIG. 4, the communications device 400 includes a processor 402, a transceiver 404, a plurality of antennas 406, a memory 408, an I/O (input/output) interface 410, and a bus 412. The memory 408 is further configured to store an instruction 4082 and data 4084. In addition, the processor 402, the transceiver 404, the memory 408, and the I/O interface 410 are in communication connection with each other by using the bus 412. The plurality of antennas 406 are connected to the transceiver 404. In one embodiment, the processor 402, the transceiver 404, the memory 408, and the I/O interface 410 may alternatively be in communication connection with each other in another connection manner in addition to using the bus 412.

The processor 402 may be a general-purpose processor. The general-purpose processor may be a processor that performs a particular operation and/or operation by reading and executing an instruction (such as the instruction 4082) stored in a memory (such as the memory 408). In a process in which the general-purpose processor performs the foregoing operation and/or operation, data (such as the data 4084) stored in the memory (such as the memory 408) may be used. The general-purpose processor may be, for example, but is not limited to, a central processing unit (CPU). In addition, the processor 402 may alternatively be a special-purpose processor. The special-purpose processor may be a processor specially designed to perform a particular operation and/or operation. The special-purpose processor may be, for example, but is not limited to, a digit signal processor (DSP), an application-specific integrated circuit (ASIC), or a field programmable gate array (FPGA). In addition, the processor 402 may alternatively be a combination of a plurality of processors, for example, a multi-core processor.

The transceiver 404 is configured to receive and send a signal. A specific process of signal receiving and sending is performed by using at least one of the plurality of antennas 406.

The memory 408 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 408 is specifically configured to store the instruction 4082 and the data 4084. When the processor 402 is a general-purpose processor, the processor 402 may perform a particular operation by reading and executing the instruction 4082 stored in the memory 408. In a process of performing the foregoing operation, the data 4084 may need to be used.

The I/O interface 410 is configured to receive an instruction and/or data from a peripheral device, and output an instruction and/or data to the peripheral device.

In one embodiment, the processor may be configured to perform, for example, but not limited to, baseband related processing, and the transceiver may be configured to perform, for example, but not limited to, radio frequency transmission and receiving. The foregoing components may be separately disposed on chips independent of each other, or at least some or all of the components may be disposed on a same chip. For example, the processor may further be classified into an analog baseband processor and a digital baseband processor. The analog baseband processor and the transceiver may be integrated on a same chip, and the digital baseband processor may be disposed on an independent chip. With continuous development of integrated circuit technologies, more components can be integrated on a same chip. For example, the digital baseband processor and a plurality of application processors (for example, but not limited to, a graphics processor and a multimedia processor) may be integrated on a same chip. Such a chip may be referred to as a system on chip. Whether all the components are independently disposed on different chips or integrated and disposed on one or more chips usually depends on a specific product design requirement. Specific implementation forms of the components are not limited in the embodiments of the present invention.

In one embodiment, the communications device 400 may further include other hardware components, and the other hardware components are not listed in this specification one by one.

Specific functions of the hardware components in the communications device 400 are described in detail below.

Figure 5:
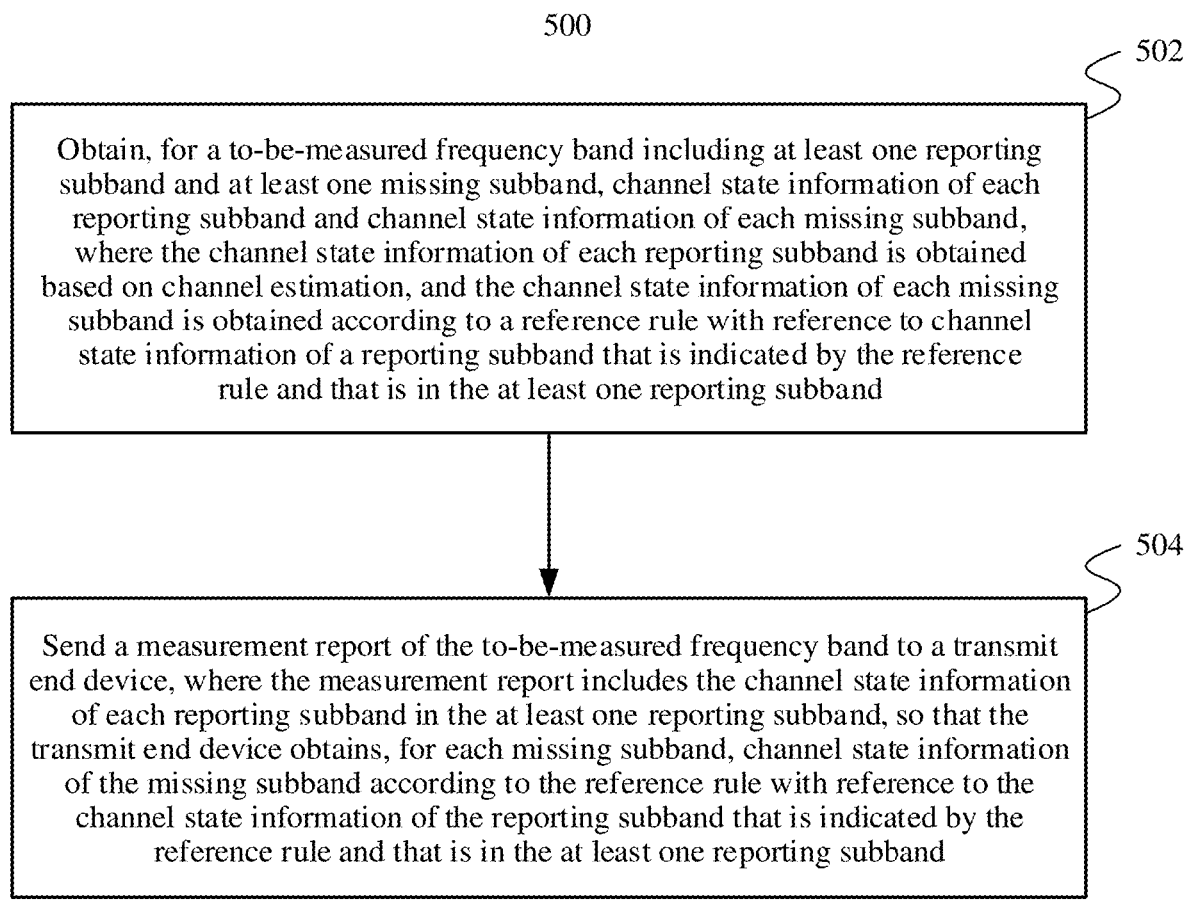
FIG. 5 is an example of a flowchart of a channel measurement method 500 according to an embodiment of the present invention.

FIG. 5 is an example of a flowchart of a channel measurement method 500 according to an embodiment of the present invention. In one embodiment, the method 500 may be performed by a receive end device. The receive end device may be implemented by using the communications device 300 shown in FIG. 3 and the communications device 400 shown in FIG. 4.

Operation 502. Obtain, for a to-be-measured frequency band including at least one reporting subband and at least one missing subband, channel state information of each reporting subband and channel state information of each missing subband, where the channel state information of each reporting subband is obtained based on channel estimation, and the channel state information of each missing subband is obtained according to a reference rule with reference to channel state information of a reporting subband that is indicated by the reference rule and that is in the at least one reporting subband.

In one embodiment, operation 502 may be performed by the processing module 302 and the processor 402.

Operation 504. Send a measurement report of the to-be-measured frequency band to a transmit end device, where the measurement report includes the channel state information of each reporting subband in the at least one reporting subband, so that the transmit end device obtains, for each missing subband, channel state information of the missing subband according to the reference rule with reference to the channel state information of the reporting subband that is indicated by the reference rule and that is in the at least one reporting subband.

In one embodiment, operation 504 may be performed by the transceiver module 304 and the transceiver 404.

Compared with feeding back a measurement report that includes channel state information of each subband, the measurement report including channel state information of only some subbands is fed back in this embodiment of the present invention, thereby helping reduce feedback overheads brought by channel measurement. In addition, for channel state information of other subbands, the receive end device and the transmit end device generate channel state information of each subband in the other subbands based on a same rule and according to channel state information of a subband indicated by the rule in the some subbands, thereby helping implement consistency of the channel state information between the receive end device and the transmit end device, and avoiding adverse impact on a transmission effect.

A to-be-measured frequency band may include a plurality of subbands, and these subbands may be continuous, may be discontinuous, or may be partially continuous. Whether these subbands are continuous and continuous forms of these subbands are not limited in this embodiment of the present invention. In one embodiment, the to-be-measured frequency band may be the reporting bandwidth described above.

The plurality of subbands included in the to-be-measured frequency band may be classified into two types of subbands: a reporting subband and a missing subband respectively. In addition, in the to-be-measured frequency band, each of the types of subbands includes at least one subband. In addition, channel state information of a reporting subband is obtained based on channel estimation, and channel state information of a missing subband is obtained according to a reference rule with reference to channel state information of a reporting subband that is indicated by the reference rule and that is in reporting subbands. Moreover, the channel state information of the reporting subband is included in a measurement report and sent to the transmit end device, and the channel state information of the missing subband is not sent to the transmit end device. In this case, to implement consistency of the channel state information of the missing subband between the receive end device and the transmit end device, the transmit end device also needs to obtain the channel state information of the missing subband according to the reference rule with reference to the channel state information of the reporting subband that is indicated by the reference rule and that is in the reporting subbands. In this way, the channel state information, of the missing subband, obtained by the receive end device is the same as that obtained by the transmit end device.

Figure 6:
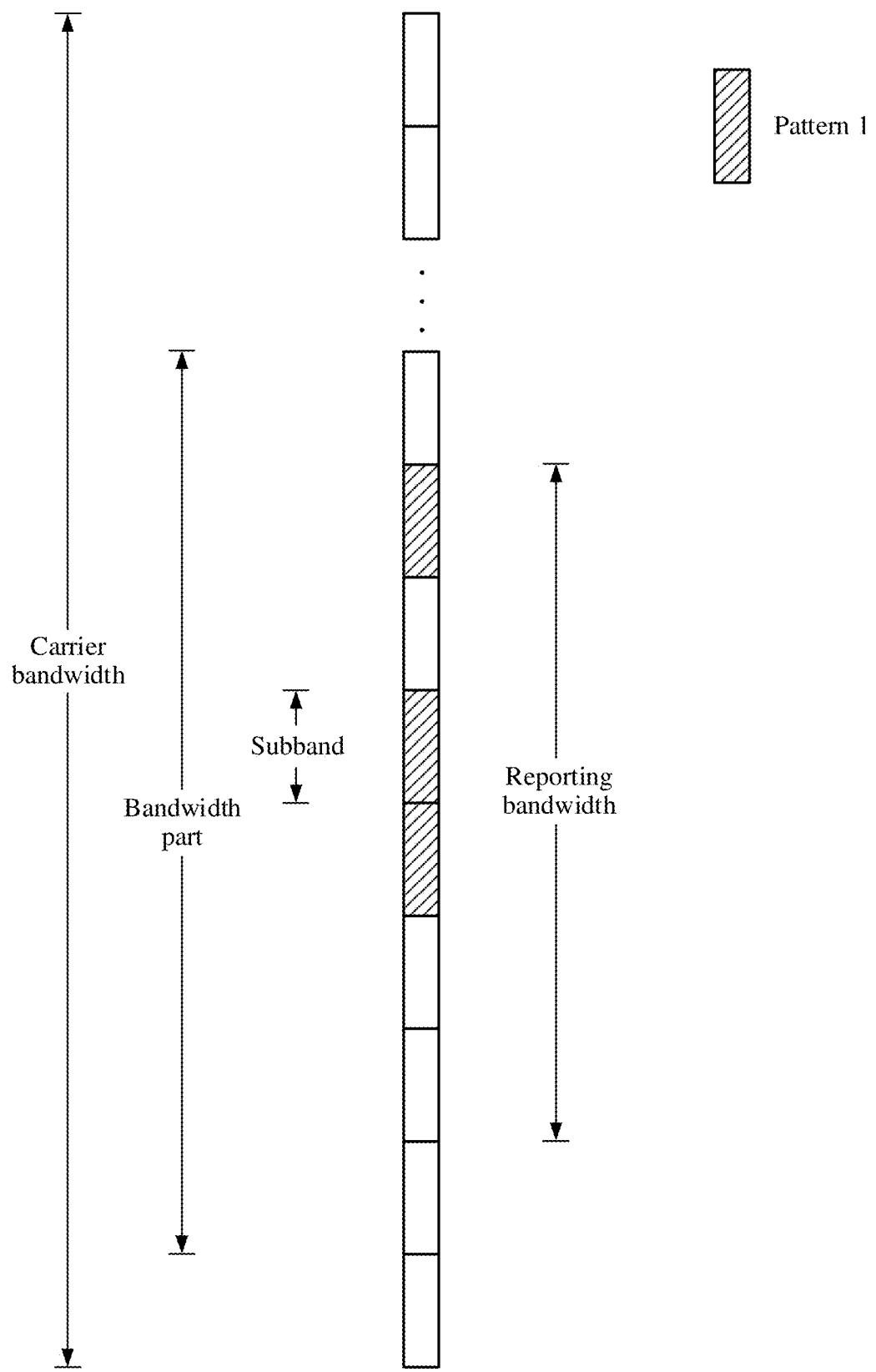
FIG. 6 is a schematic diagram of frequency band division according to another embodiment of the present invention.
Figure 7:
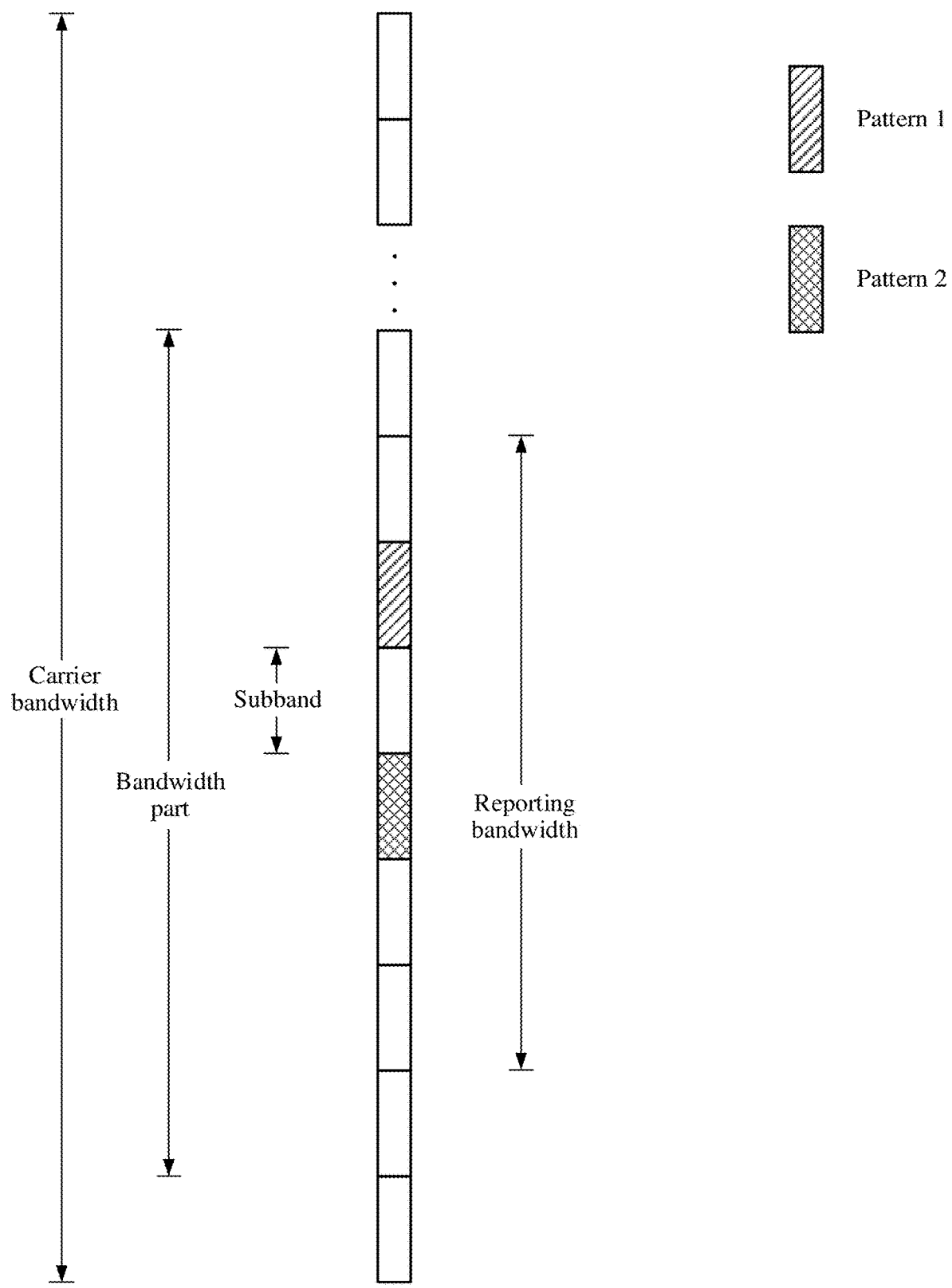
FIG. 7 is a schematic diagram of frequency band division according to still another embodiment of the present invention.

For ease of understanding, the to-be-measured frequency band provided in this embodiment of the present invention may be understood with reference to FIG. 6 and FIG. 7. In FIG. 6 and FIG. 7, the to-be-measured frequency band is specifically reflected as a reporting bandwidth. For specific content of a carrier bandwidth, a bandwidth part, a subband, and the reporting bandwidth, refer to the foregoing descriptions performed with reference to FIG. 1. Further, in FIG. 6, a reporting bandwidth includes six subbands, which are respectively six subbands that the reporting bandwidth spans across. In these subbands, three subbands indicated by a pattern 1 are missing subbands, and the other three subbands are reporting subbands. In FIG. 7, a reporting bandwidth spans across six subbands, but a subband indicated by a pattern 2 is not a part of the reporting bandwidth. Therefore, the reporting bandwidth includes only five subbands other than the subband indicated by the pattern 2 in the six subbands that are spanned across. In addition, in FIG. 7, one subband indicated by a pattern 1 is a missing subband, and the other four subbands are reporting subbands.

In the foregoing method 500, because the channel state information of the missing subband needs to be obtained with reference to the channel state information of the reporting subband, the channel state information of the missing subband and the channel state information of the reporting subband should belong to a same type, and this type of channel state information may be, for example, but is not limited to, one of a CQI, a PMI, an RI, and a CRI. It should be noted that in a specific embodiment, the receive end device may feed back, to the transmit end device, a plurality of types of channel state information of a subband included in the to-be-measured frequency band. Each type of channel state information may be reported with reference to the method 500.

If the missing subband is determined by the receive end device, a person skilled in the art should understand that a measurement report or another message may include an indication for the missing subband. In one embodiment, there are a plurality of types of manners of the foregoing indication, for example, but not limited to, an implicit indication, an explicit indication, a direct indication, an indirect indication, a combination of the foregoing indication manners, or the like. For example, the direct indication means directly indicating to-be-indicated information, for example, directly indicating a missing subband. The indirect indication means indicating to-be-indicated information by indicating other information, for example, indicating a missing subband by indicating a reporting subband. For a specific implementation of the foregoing indication, refer to the prior art. This is not limited in the present invention. It should be noted that the foregoing descriptions of the manners of the indication are also applicable to another indication mentioned in this specification.

According to another aspect, the missing subband may be specified by the transmit end device and indicated to the receive end device. In this case, the method 500 may further include:

receiving missing subband indication information from the transmit end device, where the missing subband indication information is used to indicate the at least one missing subband; and determining the at least one missing subband based on the missing subband indication information.

In one embodiment, the foregoing operation of receiving missing subband indication information from the transmit end device may be performed by the transceiver module 304 and the transceiver 404, and the foregoing operation of determining the at least one missing subband based on the missing subband indication information may be performed by the processing module 302 and the processor 402. It should be noted that the foregoing missing subband indication process may be used as a part of the method 500, or the method 500 may be used as a part of the foregoing process.

The missing subband indication information may be sent by using one of the following signaling:

physical layer signaling;

media access control layer signaling; and radio resource control signaling.

If the missing subband needs to be frequently or dynamically indicated, physical layer signaling may be preferentially used to transmit the missing subband indication information.

The physical layer signaling is also referred to as layer 1 (L1) signaling, and may usually be carried in a control part in a physical layer frame. A typical example of the L1 signaling is downlink control information (DCI) carried on a physical downlink control channel (PDCCH) defined in an LTE standard. In some cases, the L1 signaling may alternatively be carried in a data part in the physical layer frame. It is not difficult to learn that a sending period or a signaling period of the L1 signaling is usually a period of the physical layer frame. Therefore, this type of signaling is usually used to implement some dynamic control, to transfer some information that change frequently. For example, resource allocation information may be transmitted by using the physical layer signaling.

The media access control (MAC) layer signaling is layer 2 (L2) signaling, and may be usually carried in, for example, but not limited to, a frame header of a layer 2 frame. The frame header may further carry, for example, but not limited to, information such as a source address and a destination address. The layer 2 frame usually further includes a frame body in addition to the frame header. In some cases, the L2 signaling may alternatively be carried in the frame body of the layer 2 frame. A typical example of the layer 2 signaling is signaling carried in a frame control field in a frame header of a MAC frame in the 802.11 series standards, or a MAC control entity (MAC-CE) defined in some protocols. Usually, the layer 2 frame may be carried in the data part of the physical layer frame. The missing subband indication information may alternatively be sent by using other layer 2 signaling than the media access control layer signaling.

The radio resource control (RRC) signaling is layer 3 (L3) signaling, and is usually some control messages. The L3 signaling may be usually carried in the frame body of the layer 2 frame. A sending period or a control period of the L3 signaling is usually relatively long, and the L3 signaling is applicable to sending of some information that does not change frequently. For example, in some existing communication standards, the L3 signaling is usually used to carry some configuration information. The missing subband indication information may alternatively be sent by using other layer 3 signaling than the RRC signaling.

The foregoing describes only principles of the physical layer signaling, the MAC layer signaling, the RRC signaling, the layer 1 signaling, the layer 2 signaling, and the layer 3 signaling. For specific details about the three types of signaling, refer to the prior art. Therefore, details are not described in this specification.

In the missing subband indication solution described above, the missing subband indication information is used to indicate the at least one missing subband, may be specifically used to indicate the at least one missing subband one by one, or may be used to indicate a missing subband configuration solution, where the configuration solution records the at least one missing subband. It is not difficult to understand that in the former solution, an indication manner is more flexible but indication overheads are relatively high, and in the latter solution, indication overheads are relatively low but an indication manner is relatively fixed. When the missing subband configuration solution is used, a plurality of missing subband configuration solutions may be agreed on in a communication standard, and these missing subband configuration solutions may be written in advance before delivery of the receive end device and the transmit end device, so that in a process of interaction between the receive end device and the transmit end device, an index of a missing subband configuration solution is transferred to indicate missing subbands. In addition, the foregoing plurality of missing subband configuration solutions may be configured by the transmit end device for the receive end device in a process (for example, an initial access process) of interaction between the transmit end device and the receive end device. In this case, the method 500 may further include:

receiving missing subband configuration information from the transmit end device, where the missing subband configuration information includes the plurality of missing subband configuration solutions, and each configuration solution records a plurality of missing subbands; and determining the plurality of missing subband configuration solutions based on the missing subband configuration information.

In one embodiment, the foregoing operation of receiving missing subband configuration information from the transmit end device may be performed by the transceiver module 304 and the transceiver 404, and the foregoing operation of determining the plurality of missing subband configuration solutions based on the missing subband configuration information may be performed by the processing module 302 and the processor 402. It should be noted that the foregoing missing subband configuration process may be used as a part of the method 500, or the method 500 may be used as a part of the foregoing process.

In one embodiment, the missing subband configuration information may be sent by using one of the following signaling:

physical layer signaling;

media access control layer signaling; and radio resource control signaling.

Generally, a sending period of the missing subband configuration information is relatively long, and therefore, the media access control layer signaling or the radio resource control signaling may be preferably used to transmit the missing subband configuration information.

According to still another aspect, the missing subband may alternatively be specified in a communication standard in advance. It is not difficult to understand that compared with the manner of indicating the missing subband, the manner of specifying the missing subband in the communication standard in advance is beneficial to reducing signaling overheads brought by the indication.

The foregoing measurement report may be transmitted by using one message, or may be transmitted by using a plurality of messages. A specific transmission manner is not limited in this embodiment of the present invention. In addition, a plurality of types of same-type information (such as the channel state information) may be included in a measurement report and independent of each other, or may be included in a measurement report in a mutual association manner, or may be included in a measurement report in another manner. For example, the foregoing mutual association manner may be a differential manner. For example, a specific inclusion manner is not limited in the embodiments of the present invention. It should be noted that the foregoing descriptions are also applicable to other signaling in the embodiments of the present invention, for example, but not limited to, the missing subband indication information.

The reference rule specifies the following sub-rules:

A. Reporting subband of which channel state information to which reference may be made for a missing subband; and B. How to obtain channel state information of the missing subband with reference to the channel state information of the reporting subband in the sub-rule A.

In one embodiment, the sub-rule A may be designed based on a specific requirement, and specific content of the sub-rule A is not limited in the embodiments of the present invention. For example, the sub-rule A may be, for example, but is not limited to, one or any combination of the following rules:

1. Reporting subband closest to the missing subband in frequency;

2. Reporting subband whose frequency is lower than that of the missing subband;

3. Reporting subband whose frequency is higher than that of the missing subband;

4. Reporting subband in a continuous subband group in which the missing subband is located, where a subband in the continuous subband group belongs to the to-be-measured frequency band, and any subband, except the subband in the continuous subband group, in the to-be-measured frequency band is discontinuous with any subband in the continuous subband group;

5. Reporting subband continuous with the missing subband;

6. Reporting subband having a highest frequency; and

7. Reporting subband having a lowest frequency.

For example, the following sub-rule may be obtained by combining the foregoing manner 2 with the foregoing manner 5: a reporting subband that is continuous with the missing subband and whose frequency is lower than that of the missing subband. In addition, a plurality of sub-rules may be obtained through combination, and a relationship between the sub-rules is further set, to avoid a case in which a reporting subband complying with the sub-rule A does not exist. For example, a sub-rule X and a sub-rule Y are obtained through combination, and it is further stipulated that when the reporting subband cannot be determined through the sub-rule X, the reporting subband is determined through the sub-rule Y.

It is not difficult to understand that there may be one or more reporting subbands determined according to the sub-rule A.

In one embodiment, the sub-rule B may be designed based on a specific requirement, and specific content of the sub-rule B is not limited in the embodiments of the present invention. For example, the sub-rule B may be that if one reporting subband is determined according to the sub-rule A, channel state information of the reporting subband is set as channel state information of the missing subband; or channel state information of the missing subband is calculated based on the channel state information of the reporting subband. For another example, the sub-rule B may be that if a plurality of reporting subbands are determined according to the sub-rule A, an average value of channel state information of these reporting subbands is set as channel state information of the missing subband, or for each missing subband, based on channel state information of one or more reporting subbands whose frequency is higher than that of the missing subband (for example, a reporting subband closest to the missing subband), and/or one or more reporting subbands whose frequency is lower than that of the missing subband (for example, a reporting subband closest to the missing subband), channel state information of the missing subband is obtained through interpolation, or channel state information of the missing subband is calculated in another manner based on channel state information of a plurality of reporting subbands. A plurality of calculation methods may be used when channel state information of the missing subband is calculated. A specifically used calculation method is not limited in the embodiments of the present invention.

In addition, for each missing subband, the receive end device may also obtain channel state information of the missing subband through channel estimation, but still does not send the channel state information to the transmit end device. In addition, the transmit end device may set channel state information of the missing subband without depending on the reference rule. In other words, when setting the channel state information of the missing subband, the transmit end device may not consider an actual channel environment. It is not difficult to understand that although this design solution can reduce feedback overheads brought by channel measurement, consistency of the channel state information of the missing subband cannot be implemented between the receive end device and the transmit end device, probably resulting in bringing adverse impact on a transmission effect.

After obtaining the channel state information of the missing subband, the transmit end device may further adjust the channel state information. Content related to the adjustment is already clearly described above. Therefore, details are not described herein again.

If the reference rule is determined by the receive end device, a person skilled in the art should understand that a measurement report or another message may include an indication for the reference rule.

According to another aspect, the reference rule may alternatively be indicated by the transmit end device. In this case, the method 500 may further include:

receiving reference rule indication information from the transmit end device, where the reference rule indication information is used to indicate the reference rule, and the reference rule is one of a plurality of reference rules; and determining the reference rule based on the reference rule indication information.

It should be noted that the reference rule indication process may be used as a part of the method 500, or the method 500 may be used as a part of the foregoing process.

In one embodiment, the reference rule indication information may be sent by using one of the following signaling:

physical layer signaling;
media access control layer signaling; and
radio resource control signaling.

If the reference rule needs to be frequently or dynamically indicated, physical layer signaling may be preferentially used to transmit the reference rule indication information.

In one embodiment, the foregoing operation of receiving reference rule indication information from the transmit end device may be performed by the transceiver module 304 and the transceiver 404, and the foregoing operation of determining the reference rule based on the reference rule indication information may be performed by the processing module 302 and the processor 402.

In one embodiment, a plurality of reference rules may be agreed on in a communication standard, and these reference rules are written in advance before delivery of the receive end device and the transmit end device, so that in a process of interaction between the receive end device and the transmit end device, the reference rule is indicated by using reference rule indication information carrying, for example, a reference rule index. In addition, the plurality of reference rules may be configured by the transmit end device for the receive end device in a process (for example, an initial access process) of interaction between the transmit end device and the receive end device. In this case, the method 500 may further include:

receiving reference rule configuration information from the transmit end device, where the reference rule configuration information includes the plurality of reference rules; and determining the plurality of reference rules based on the reference rule configuration information.

In one embodiment, the foregoing operation of receiving reference rule configuration information from the transmit end device may be performed by the transceiver module 304 and the transceiver 404, and the foregoing operation of determining the plurality of reference rule based on the reference rule configuration information may be performed by the processing module 302 and the processor 402. It should be noted that the foregoing reference rule configuration process may be used as a part of the method 500, or the method 500 may be used as a part of the foregoing process.

In one embodiment, the reference rule configuration information may be sent by using one of the following signaling:

physical layer signaling;
media access control layer signaling; and
radio resource control signaling.

Generally, a sending period of the reference rule configuration information is relatively long, and therefore, the media access control layer signaling or the radio resource control signaling may be preferably used to transmit the reference rule configuration information.

In addition, the reference rule may alternatively be specified in a communication standard in advance. It is not difficult to understand that compared with the manner of indicating the reference rule, the manner of specifying the reference rule in the communication standard in advance is beneficial to reducing signaling overheads brought by the indication, and is applicable to a case in which the reference rule is not frequently changed.

In one embodiment, the method 500 may further include:

calculating channel-related information based on a channel state information group, where the channel state information group includes at least channel state information of at least one missing subband in the at least one missing subband; and sending the channel-related information to the transmit end device.

The operation of calculating channel-related information based on a channel state information group may be performed by the processing module 302 and the processor 402, and the operation of sending the channel-related information to the transmit end device may be performed by the transceiver module 304 and the transceiver 404.

In one embodiment, the channel state information group may include the channel state information of the missing subband, or may include the channel state information of the reporting subband, or a combination of these pieces of channel state information. The foregoing other information is not limited in the embodiments of the present invention. In addition, the channel-related information may be wideband channel state information, subband channel state information, or other information.

The channel-related information may be channel state information of the to-be-measured frequency band, that is, wideband channel state information of the to-be-measured frequency band. In this case, the calculating channel-related information based on a channel state information group may be specifically: calculating the channel state information of the to-be-measured frequency band based on channel state information of reporting subbands and channel state information of missing subbands. For example, the channel state information of the to-be-measured frequency band may be a CQI, the channel state information of the reporting subbands and the channel state information of the missing subbands may each be a PMI, or the channel state information of the reporting subbands and the channel state information of the missing subbands may each alternatively be a CQI. A person skilled in the art should understand that in addition to calculating the channel state information of the to-be-measured frequency band based on the channel state information of the reporting subbands and the channel state information of the missing subbands, another method may also be used to calculate the channel state information of the to-be-measured frequency band, which is, for example, but is not limited to, using the to-be-measured frequency band as a whole to calculate the channel state information of the to-be-measured frequency band. Content related to this belongs to the prior art, and is not repeatedly described in the embodiments of the present invention. If the channel-related information is the channel state information of the to-be-measured frequency band, and types of the channel state information, the channel state information of the reporting subbands, and the channel state information of the missing subbands are the same, the channel state information of the to-be-measured frequency band and channel state information of each reporting subband may be reported in a differential manner. Specifically, the channel state information of the to-be-measured frequency band, and a difference between the channel state information of each reporting subband and the channel state information of the to-be-measured frequency band may be reported.

The channel-related information may alternatively be other channel state information of the missing subband. In this case, the calculating channel-related information based on a channel state information group may be specifically: calculating, based on the channel state information of the missing subband, other channel state information of the missing subband, where a type of the channel state information is different from that of the foregoing other channel state information. For example, the channel state information may be a PMI, and the other channel state information may be a CQI.

For another example, the channel-related information may be other information of the missing subband. In this case, the calculating channel-related information based on a channel state information group may be specifically: calculating, based on channel state information of a missing subband, other information of the missing subband. The other information may be, for example, but is not limited to, a signal to interference plus noise ratio (SINR) of the missing subband.

In one embodiment, specific content about the channel-related information is not limited in the embodiments of the present invention.

Figure 8:
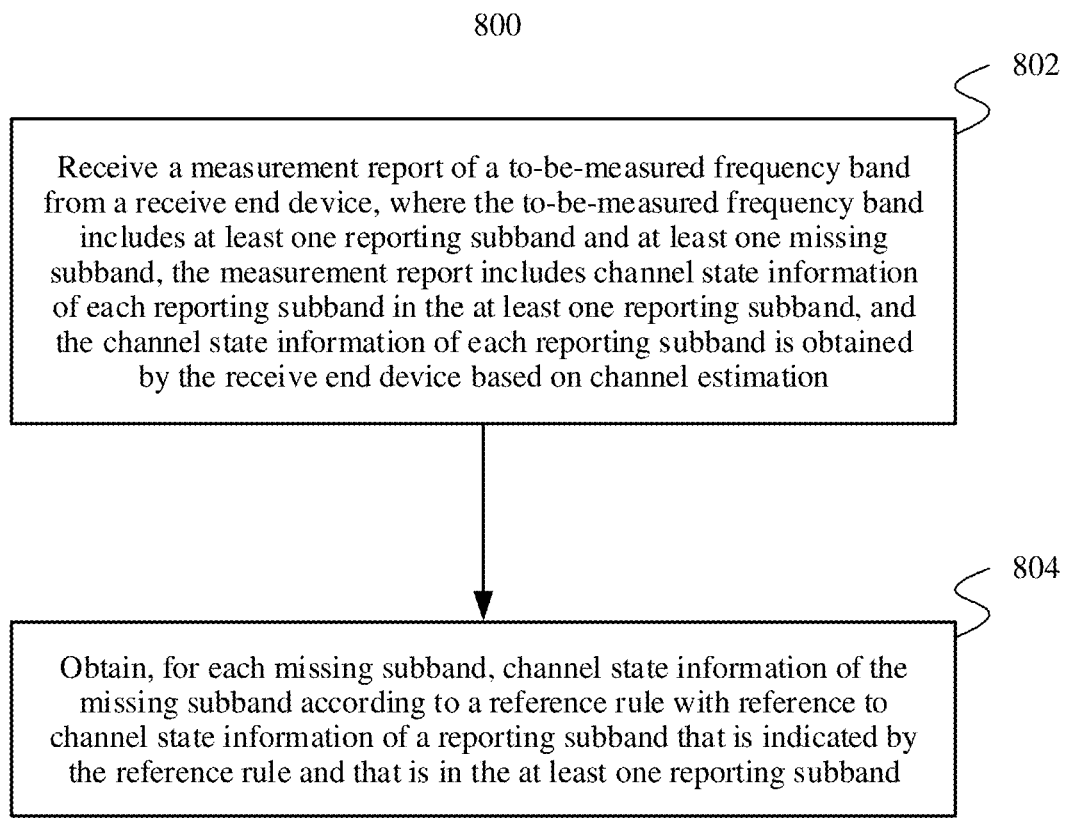
FIG. 8 is an example of a flowchart of a channel measurement method according to an embodiment of the present invention.

FIG. 8 is an example of a flowchart of a channel measurement method 800 according to an embodiment of the present invention. In one embodiment, the method 800 may be performed by a transmit end device. The transmit end device may be implemented by using the communications device 300 shown in FIG. 3 and the communications device 400 shown in FIG. 4.

Operation 802. Receive a measurement report of a to-be-measured frequency band from a receive end device, where the to-be-measured frequency band includes at least one reporting subband and at least one missing subband, the measurement report includes channel state information of each reporting subband in the at least one reporting subband, and the channel state information of each reporting subband is obtained by the receive end device based on channel estimation.

In one embodiment, operation 802 may be performed by the transceiver module 304 and the transceiver 404.

Operation 804. Obtain, for each missing subband, channel state information of the missing subband according to a reference rule with reference to channel state information of a reporting subband that is indicated by the reference rule and that is in the at least one reporting subband.

In one embodiment, operation 804 may be performed by the processing module 302 and the processor 402.

In one embodiment, the method 800 may further include:
generating missing subband indication information, where the missing subband indication information is used to indicate the at least one missing subband; and
sending the missing subband indication information to the receive end device.

The operation of generating missing subband indication information may be performed by the processing module 302 and the processor 402, and the operation of sending the missing subband indication information to the receive end device may be performed by the transceiver module 304 and the transceiver 404. It should be noted that the foregoing missing subband indication process may be used as a part of the method 800, or the method 800 may be used as a part of the foregoing process.

In one embodiment, the method 800 may further include:
generating missing subband configuration information, where the missing subband configuration information includes a plurality of missing subband configuration solutions, and each configuration solution records a plurality of missing subbands; and
sending the missing subband configuration information to the receive end device.

The operation of generating missing subband configuration information may be performed by the processing module 302 and the processor 402, and the operation of sending the missing subband configuration information to the receive end device may be performed by the transceiver module 304 and the transceiver 404. It should be noted that the foregoing missing subband configuration process may be used as a part of the method 800, or the method 800 may be used as a part of the foregoing process.

In one embodiment, the method 800 may further include:
generating reference rule indication information, where the reference rule indication information is used to indicate the reference rule, and the reference rule is one of a plurality of reference rules; and
sending the reference rule indication information to the receive end device.

The operation of generating reference rule indication information may be performed by the processing module 302 and the processor 402, and the operation of sending the reference rule indication information to the receive end device may be performed by the transceiver module 304 and the transceiver 404. It should be noted that the foregoing reference rule indication process may be used as a part of the method 800, or the method 800 may be used as a part of the foregoing process.

In one embodiment, the method 800 may further include:

generating reference rule configuration information, where the reference rule configuration information includes the plurality of reference rules; and sending the reference rule configuration information to the receive end device.

In one embodiment, the operation of generating reference rule configuration information may be performed by the processing module 302 and the processor 402, and the sending the reference rule configuration information to the receive end device may be performed by the transceiver module 304 and the transceiver 404. It should be noted that the foregoing reference rule configuration process may be used as a part of the method 800, or the method 800 may be used as a part of the foregoing process.

In one embodiment, the method 800 may further include:

receiving channel-related information from the receive end device, where the channel-related information is obtained by the receive end device through calculation based on a channel state information group, and the channel state information group includes channel state information of at least one missing subband in the at least one missing subband. In one embodiment, the operation may be performed by the transceiver module 304 and the transceiver 404.

The method 800 corresponds to the method 500, and related technical content is described in detail above with reference to the method 500. Therefore, details are not described herein again.

In view that a specific method for transmitting channel state information of a subband of a to-be-measured frequency band is not specified in a next generation wireless communication standard, an embodiment of the present invention further provides a method for reporting uplink control information (UCI). The following describes the method in detail with reference to the accompanying drawings.

Figure 9:
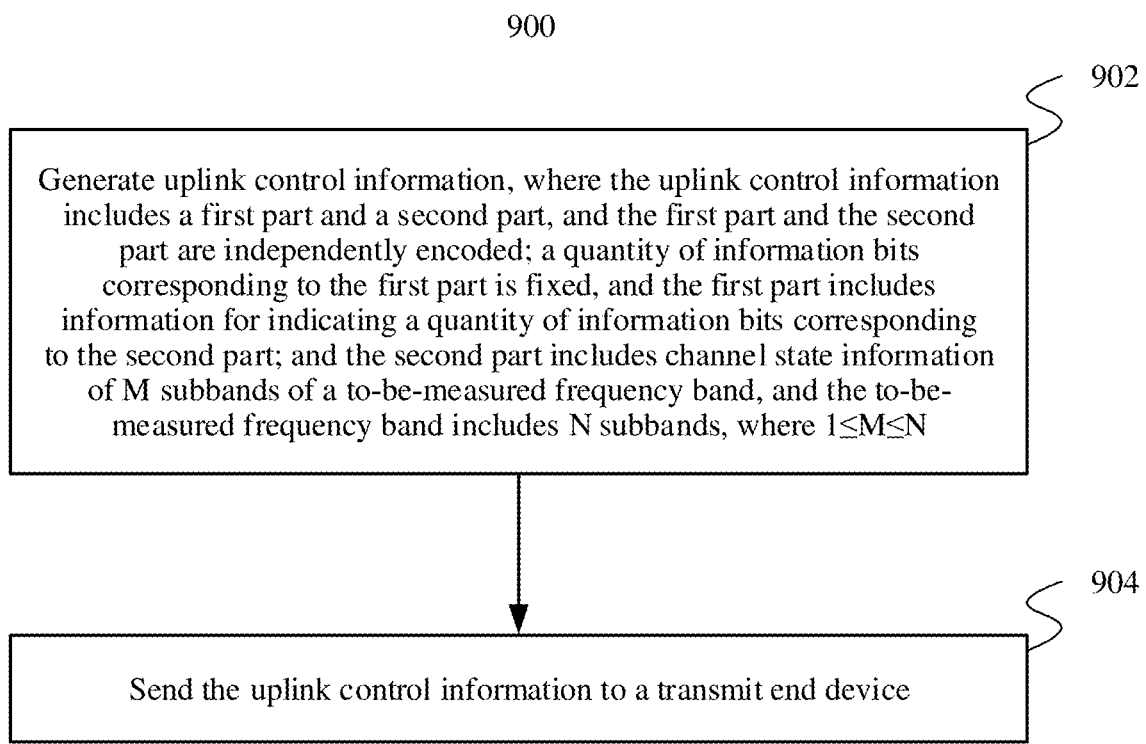
FIG. 9 is an example of a flowchart of an uplink control information sending method according to an embodiment of the present invention.

FIG. 9 is an example of a flowchart of an uplink control information sending method 900 according to an embodiment of the present invention. In one embodiment, the method 900 may be performed by a receive end device. The receive end device may be implemented by using the communications device 300 shown in FIG. 3 and the communications device 400 shown in FIG. 4.

Operation 902. Generate uplink control information, where the uplink control information includes a first part and a second part, and the first part and the second part are independently encoded; a quantity of information bits corresponding to the first part is fixed, and the first part includes information for indicating a quantity of information bits corresponding to the second part; and the second part includes channel state information of M subbands of a to-be-measured frequency band, and the to-be-measured frequency band includes N subbands, where 1≤M≤N.

Operation 904. Send the uplink control information to a transmit end device.

In one embodiment, operation 902 may be performed by the processing module 302 and the processor 402, and operation 904 may be performed by the transceiver module 304 and the transceiver 404.

A person skilled in the art should understand that UCI usually includes a scheduling request, channel state information, and information related to retransmission control (for example, an ACK and a NACK). For specific content of the information, refer to the prior art, and details are not described in this specification. Transmission processing such as encoding and modulation needs to be performed before the UCI is transmitted, so that the UCI is converted into a modulation symbol form from a bit form for transmission. For ease of describing the method for reporting uplink control information provided in this embodiment of the present invention, when information included in the UCI mentioned in the reporting method is described, if there is no special description, or if the information does not conflict with an actual function or internal logic of the information in related description, the information refers to an information bit that is included in the UCI and on which transmission processing such as encoding and modulation has not been performed, that is, an original information bit or an information bit payload. Using a long term evolution (LTE) standard as an example, a quantity of information bits of an ACK or a NACK included in UCI may be 1 or 2, respectively corresponding to a case in which there is one codeword and a case in which there are two codewords.

In the technical solution provided in this embodiment of the present invention, the uplink control information may include two parts: the first part and the second part respectively, and the first part and the second part are separately independently encoded. Still further, a quantity of information bits included in the first part is fixed, and the first part includes information for indicating a quantity of information bits included in the second part. Particularly, the second part further includes the channel state information of the M subbands of the to-be-measured frequency band, and the measurement frequency band includes N subbands, where 1≤M≤N. In addition, the first part may further include channel state information of the to-be-measured frequency band, that is, wideband channel state information. A type of subband channel state information may be the same as or different from a type of the wideband channel state information. Still further, both of the two may be one of a CQI, a PMI, an RI, and a CRI. In addition, the channel state information of the M subbands should be understood as belonging to a same type.

It can be easily learned from the foregoing structure of the UCI that the channel state information of the to-be-measured frequency band may be included in the first part, and the channel state information of the subbands of the to-be-measured frequency band may be included in the second part. In addition, the subbands included in the to-be-measured frequency band may include a missing subband, or may not include a missing subband. In a case in which the missing subband is included, M<N. In a case in which the missing subband is not included, M=N.

It can be learned that this embodiment of the present invention provides a method for transmitting channel state information of a subband of a to-be-measured frequency band. It should be noted that in one embodiment, the receive end device may feed back, to the transmit end device, a plurality of types of channel state information of a subband included in the to-be-measured frequency band. For each type of channel state information, refer to the method 900 for reporting. In addition, the receive end device may feed back a plurality of types of channel state information of the to-be-measured frequency band to the transmit end device. For each type of channel state information, refer to the method 900 for reporting. It is not difficult to understand that the measurement report of the to-be-measured frequency band described above can be included in the uplink control information.

Figure 10:
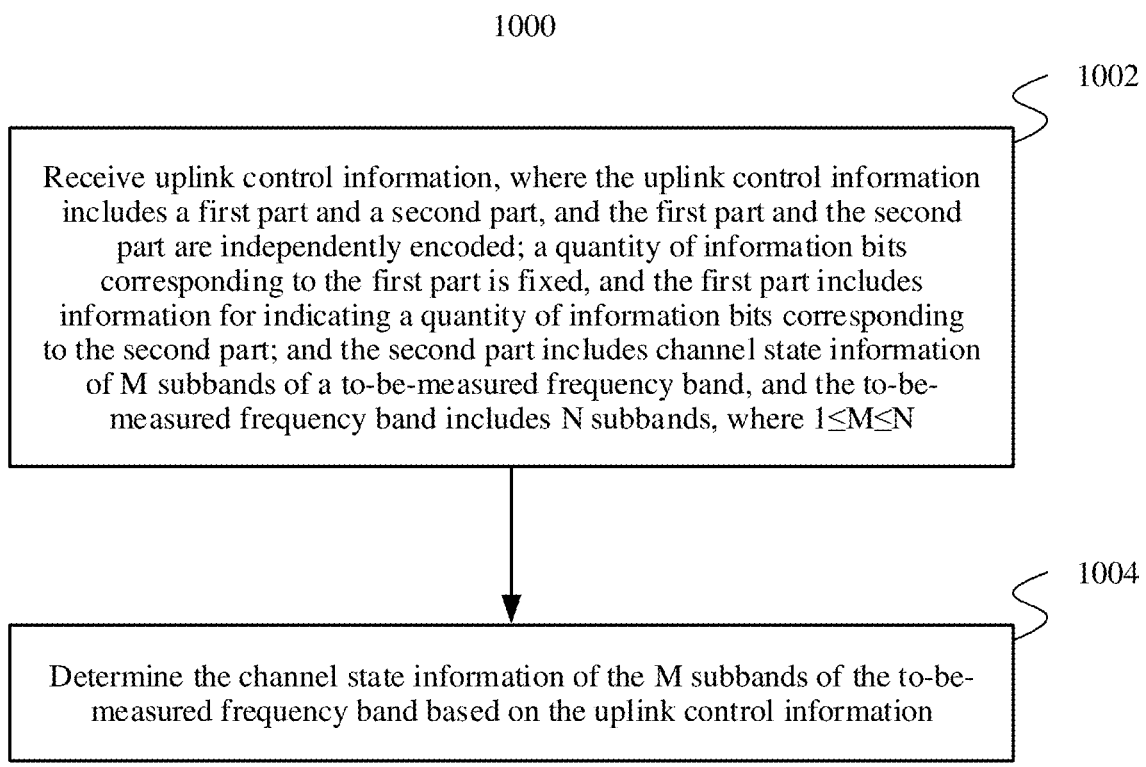
FIG. 10 is an example of a flowchart of an uplink control information receiving method according to an embodiment of the present invention.

FIG. 10 is an example of a flowchart of an uplink control information receiving method 1000 according to an embodiment of the present invention. In one embodiment, the method 900 may be performed by a transmit end device. The transmit end device may be implemented by using the communications device 300 shown in FIG. 3 and the communications device 400 shown in FIG. 4.

Operation 1002. Receive uplink control information, where the uplink control information includes a first part and a second part, and the first part and the second part are independently encoded; a quantity of information bits corresponding to the first part is fixed, and the first part includes information for indicating a quantity of information bits corresponding to the second part; and the second part includes channel state information of M subbands of a to-be-measured frequency band, and the to-be-measured frequency band includes N subbands, where $1 \leq M \leq N$.

Operation 1004. Determine the channel state information of the M subbands of the to-be-measured frequency band based on the uplink control information. In one embodiment, if M<N, it may be considered that there is a missing subband, channel state information of the missing subband may be further determined based on the technical solution described above.

In one embodiment, operation 1002 may be performed by the transceiver module 304 and the transceiver 404, and operation 1004 may be performed by the processing module 302 and the processor 402.

The method 1000 corresponds to the method 900, and related technical content is described in detail above with reference to the method 900. Therefore, details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In conclusion, the foregoing descriptions are merely embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A channel measurement method, comprising:
   obtaining, by a receive end device and for a to-be-measured frequency band comprising reporting subband, and a missing subband, channel state information of the reporting subband and channel state information of the missing subband, wherein the channel state information of the reporting subband is obtained based on channel estimation, and the channel state information of the missing subband is obtained according to a reference rule received from a transmit end device; and
   sending, by the receive end device, a measurement report of the to-be-measured frequency band to the transmit end device, wherein the measurement report comprises the channel state information of the reporting subband, wherein the transmit end device obtains the channel state information of the missing subband according to the reference rule, wherein the reference rule specifies the reporting subband, and a rule for referencing the channel state information of the reporting subband to obtain the channel state information of the missing subband.

2. The method according to claim 1, further comprising:
   receiving missing subband indication information from the transmit end device, wherein the missing subband indication information is to indicate the missing subband; and
   determining the missing subband based on the missing subband indication information.

3. The method according to claim 2, wherein the missing subband indication information is to indicate the missing subband, or a missing subband configuration solution that records the missing subband.

4. The method according to claim 1, further comprising:
   receiving missing subband configuration information from the transmit end device, wherein the missing subband configuration information comprises a plurality of missing subband configuration solutions, and each configuration solution records a plurality of missing subbands; and
   determining the plurality of missing subband configuration solutions based on the missing subband configuration information.

5. The method according to claim 1, further comprising:
   receiving reference rule indication information from the transmit end device, wherein the reference rule indication information is to indicate the reference rule, and the reference rule is one of a plurality of reference rules; and
   determining the reference rule based on the reference rule indication information.

6. The method according to claim 5, further comprising:
   receiving reference rule configuration information from the transmit end device, wherein the reference rule configuration information comprises the plurality of reference rules; and
   determining the plurality of reference rules based on the reference rule configuration information.

7. The method according to claim 1, further comprising:
   calculating channel-related information based on a channel state information group, wherein the channel state information group comprises the channel state information of the missing subband; and sending the channel-related information to the transmit end device.

8. The method according to claim 7, wherein the channel-related information is comprised in the measurement report, and is sent to the transmit end device in the measurement report.

9. The method according to claim 1, wherein the channel state information is one of the following information:
a channel quality indicator, a precoding matrix indicator, a rank indication, and a channel state information-reference signal resource indicator.

10. The method according to claim 7, wherein the channel-related information comprises at least one of the following information: channel state information of the to-be-measured frequency band, other channel state information of the subband, and other information of the subband.

11. A receive end device, comprising:
a processor;
a memory, configured to store at least one computer instruction, which when executed, causes the processor to perform operations comprising:
obtaining, by a receive end device and for a to-be-measured frequency band comprising a reporting subband, and a missing subband, channel state information of the reporting subband and channel state information of the missing subband, wherein the channel state information of the reporting subband is obtained based on channel estimation, and the channel state information of the missing subband is obtained according to a reference rule received from a transmit end device; and
sending, by the receive end device, a measurement report of the to-be-measured frequency band to the transmit end device, wherein the measurement report comprises the channel state information of the reporting subband, wherein the transmit end device obtains the channel state information of the missing subband according to the reference rule, wherein the reference rule specifies the reporting subband, and a rule for referencing the channel state information of the reporting subband to obtain the channel state information of the missing subband.

12. The device according to claim 11, the operations further comprising:
receiving missing subband indication information from the transmit end device, wherein the missing subband indication information is to indicate the missing subband; and
determining the missing subband based on the missing subband indication information.

13. The device according to claim 12, wherein the missing subband indication information is to indicate the missing subband, or a missing subband configuration solution that records the missing subband.

14. The device according to claim 11, operations further comprising:
receiving missing subband configuration information from the transmit end device, wherein the missing subband configuration information comprises a plurality of missing subband configuration solutions, and each configuration solution records a plurality of missing subbands; and
determining the plurality of missing subband configuration solutions based on the missing subband configuration information.

15. The device according to claim 11, the operations further comprising:
receiving reference rule indication information from the transmit end device, wherein the reference rule indication information is used to indicate the reference rule, and the reference rule is one of a plurality of reference rules; and
determining the reference rule based on the reference rule indication information.

16. The device according to claim 15, the operations further comprising:
receiving reference rule configuration information from the transmit end device, wherein the reference rule configuration information comprises the plurality of reference rules; and
determining the plurality of reference rules based on the reference rule configuration information.

17. The device according to claim 11, the operations further comprising:
calculating channel-related information based on a channel state information group, wherein the channel state information group comprises the channel state information of the missing subband; and
sending the channel-related information to the transmit end device.

18. The device according to claim 17, wherein the channel-related information is comprised in the measurement report, and is sent to the transmit end device in the measurement report.

19. The device according to claim 11, wherein the channel state information is one of the following information:
a channel quality indicator, a precoding matrix indicator, a rank indication, and a channel state information-reference signal resource indicator.

20. A transmit end device, comprising:
a processor;
a memory, configured to store at least one computer instruction, which when executed, causes the processor to perform operations comprising:
receiving a measurement report of a to-be-measured frequency band from a receive end device, wherein the to-be-measured frequency band comprises a reporting subband and a missing subband, wherein the measurement report comprises channel state information of the reporting subband_and the channel state information of the reporting subband is obtained by the receive end device based on channel estimation; and
obtaining_channel state information of the missing subband according to a reference rule, wherein the reference rule specifies the reporting subband, and a rule for referencing the channel state information of the reporting subband to obtain the channel state information of the missing subband.

* * * * *

UNITED STATES PATENT AND TRADEMARK OFFICE
CERTIFICATE OF CORRECTION

| | |
|---|---|
| PATENT NO. | : 11,290,906 B2 |
| APPLICATION NO. | : 16/832290 |
| DATED | : March 29, 2022 |
| INVENTOR(S) | : Ye Wu et al. |

It is certified that error appears in the above-identified patent and that said Letters Patent is hereby corrected as shown below:

In the Claims

In Claim 1, Column 34, Line 8-9, delete "measured frequency band comprising reporting subband" and insert --measured frequency band comprising a reporting subband--.

In Claim 20, Column 36, Line 50, delete "reporting subband_and" and insert --reporting subband and--.

In Claim 20, Column 36, Line 53, delete "obtaining_channel" and insert --obtaining channel--.

Signed and Sealed this
Twenty-eighth Day of June, 2022

Katherine Kelly Vidal
*Director of the United States Patent and Trademark Office*